(12) United States Patent
Baumann et al.

(10) Patent No.: US 8,684,243 B1
(45) Date of Patent: Apr. 1, 2014

(54) CHALK HOLDING DEVICES FOR BICYCLES, SCOOTERS AND SKATEBOARDS

(75) Inventors: Scott Baumann, Anacortes, WA (US); Brian Wheeler, Bellingham, WA (US); Christopher Fletcher, Bellingham, WA (US)

(73) Assignee: Chalktrail.com LLC, Ferndale, WA (US)

( * ) Notice: Subject to any disclaimer, the term of this patent is extended or adjusted under 35 U.S.C. 154(b) by 0 days.

(21) Appl. No.: 13/109,995

(22) Filed: May 17, 2011

Related U.S. Application Data

(60) Provisional application No. 61/345,593, filed on May 17, 2010, provisional application No. 61/390,180, filed on Oct. 5, 2010.

(51) Int. Cl.
*B62J 7/00* (2006.01)
*B60R 9/00* (2006.01)

(52) U.S. Cl.
USPC ............................ 224/422; 224/412; 224/562

(58) Field of Classification Search
USPC ........... 224/422, 412, 183, 924, 562; 280/811
See application file for complete search history.

(56) References Cited

U.S. PATENT DOCUMENTS

| | | | | |
|---|---|---|---|---|
| 623,805 | A | * | 4/1899 | Murphy ........................ 33/41.4 |
| 647,070 | A | * | 4/1900 | Black ........................... 33/41.4 |
| 1,816,545 | A | * | 7/1931 | Porter ........................... 401/82 |
| 2,205,713 | A | * | 6/1940 | Cain ............................ 280/816 |
| 2,687,116 | A | * | 8/1954 | Sheets ........................... 401/93 |
| 4,680,864 | A | * | 7/1987 | Heagerty ........................ 33/26 |
| 4,726,503 | A |   | 2/1988 | Bowker |
| 4,834,407 | A |   | 5/1989 | Salvo |
| 5,052,701 | A | * | 10/1991 | Olson ...................... 280/11.208 |
| 5,460,390 | A | * | 10/1995 | Miller ...................... 280/11.208 |
| 5,658,002 | A | * | 8/1997 | Szot ........................... 280/304.1 |
| 5,895,072 | A | * | 4/1999 | Coroneos et al. ............. 280/811 |
| 5,931,592 | A | * | 8/1999 | Timberlake ..................... 401/88 |
| 6,059,315 | A |   | 5/2000 | Selph |
| 6,241,410 | B1 |   | 6/2001 | Hager |
| D557,750 | S | * | 12/2007 | Monzo ........................ D21/398 |

(Continued)

FOREIGN PATENT DOCUMENTS

| | | | | |
|---|---|---|---|---|
| CA | 2433064 | A |   | 10/2004 | |
| CA | 2433064 | A1 | * | 10/2004 | ................. B62J 6/00 |

(Continued)

OTHER PUBLICATIONS

Bikecontrail website, About Us section, FAQ section, Home section, News section, http://www.bikecontrail.com/.

(Continued)

*Primary Examiner* — Justin Larson
*Assistant Examiner* — Lester L Vanterpool
(74) *Attorney, Agent, or Firm* — Tejpal S. Hansra

(57) ABSTRACT

Chalk holding devices for bicycles, scooters, skateboards and other wheeled apparatuses are provided. One exemplary embodiment includes a chalk holding device for attachment to a bicycle having a wheel and an axle with a first end and a second end. The chalk holding device has a chalk-receiving member for receiving chalk therein. The chalk holding devices also has first and second arms that extend from the chalk-receiving member towards the axle. The first arm has a first axle cup for receiving a first end of the axle and the second arm has a second axle cup for receiving a second end of the axle.

20 Claims, 35 Drawing Sheets

(56) References Cited

U.S. PATENT DOCUMENTS

| | | | |
|---|---|---|---|
| 7,419,104 B2 | 9/2008 | Roman | |
| D606,610 S * | 12/2009 | Sramek et al. | D21/771 |
| 7,757,915 B2 * | 7/2010 | Mourao | 224/401 |
| 7,942,428 B2 * | 5/2011 | Starr | 280/11.203 |
| 8,146,947 B2 * | 4/2012 | Hadley | 280/816 |
| 8,215,676 B2 * | 7/2012 | Hadley | 280/816 |
| 8,356,840 B2 * | 1/2013 | Hadley et al. | 280/816 |
| 8,414,029 B2 * | 4/2013 | Hadley | 280/816 |
| 2003/0151214 A1 * | 8/2003 | Chen | 280/11.209 |
| 2006/0239756 A1 * | 10/2006 | Paluda | 401/131 |
| 2010/0096824 A1 | 4/2010 | Hadley | |
| 2010/0171280 A1 | 7/2010 | Hadley | |
| 2011/0016734 A1 | 1/2011 | Kludjian et al. | |
| 2011/0121551 A1 | 5/2011 | Hadley et al. | |

FOREIGN PATENT DOCUMENTS

| | | | |
|---|---|---|---|
| EP | 1867368 | A | 12/2007 |
| EP | 2179913 | A | 4/2010 |
| FR | 2753634 | A | 3/1998 |
| GB | 488310 | A | 7/1938 |
| GB | 2363175 | A | 12/2001 |
| WO | 0244007 | A | 6/2002 |

OTHER PUBLICATIONS

Doobybrain.com, Contrail Bicycle Chalk Drawing Concept, http://www.doobybrain.com/2009/02/25/contrail-bicycle-chalk-drawing-concept/, Feb. 25, 2009, pp. 1-13.

Gizmodo, Joshua Kinberg and Bikes Against Bush, http://gizmodo.com/009427/joshua-kinberg-and-bikes-against-bush, May 7, 2004.

* cited by examiner

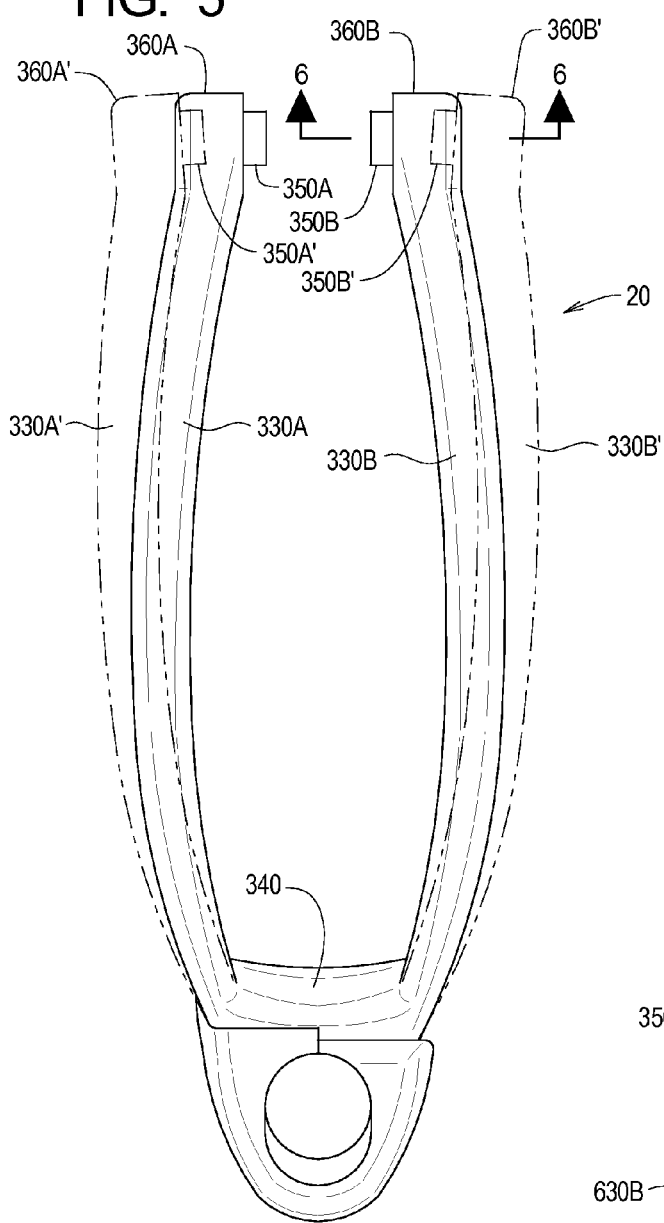
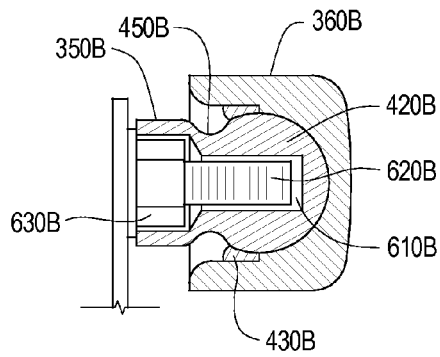

FIG. 34
FIG. 35
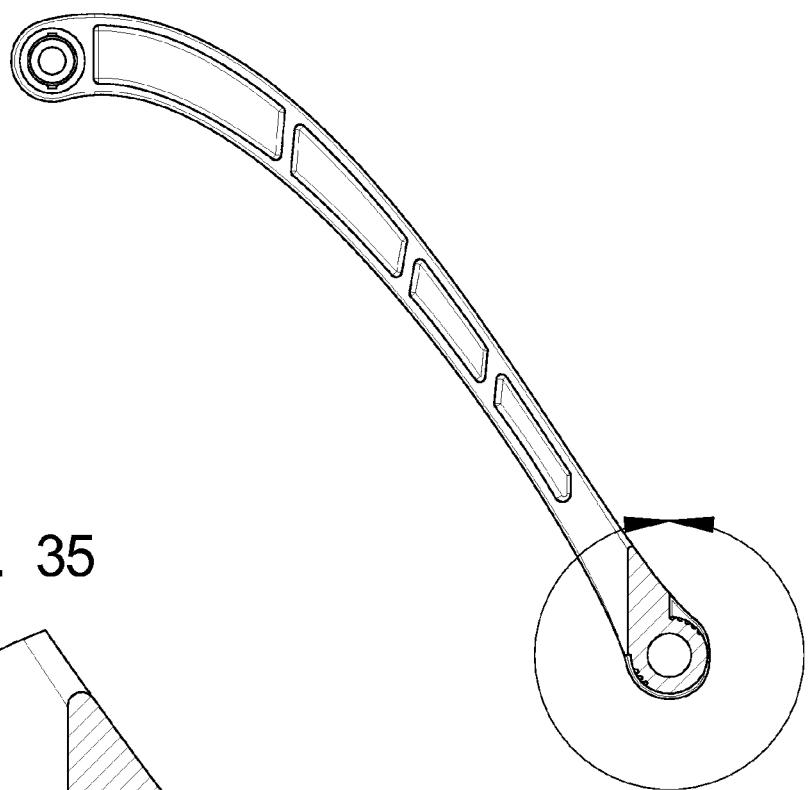
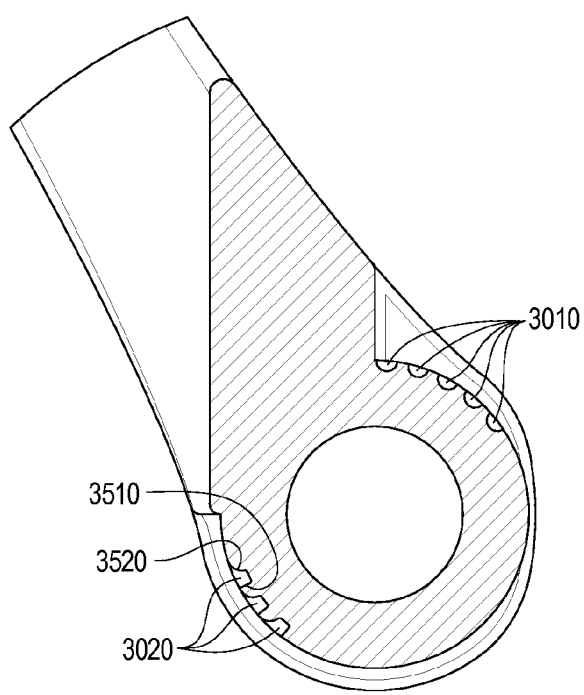

FIG. 36
FIG. 37
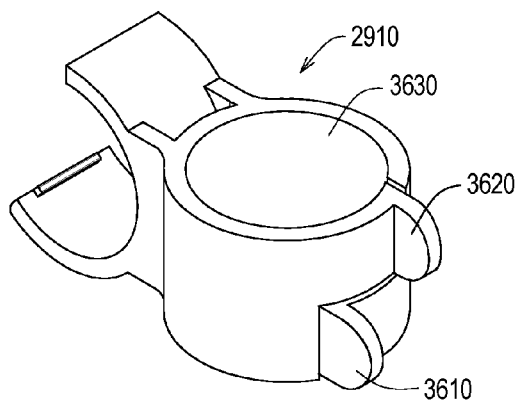
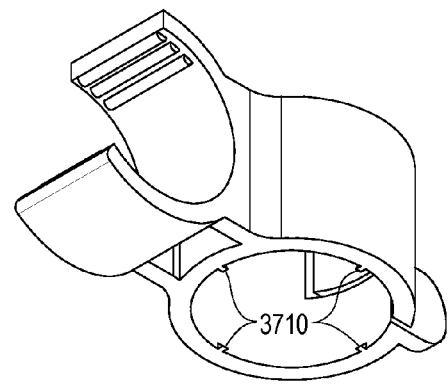
FIG. 38
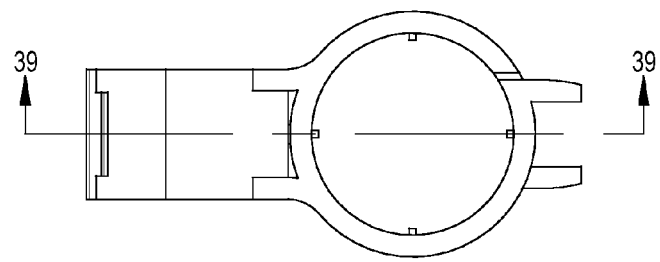
FIG. 39
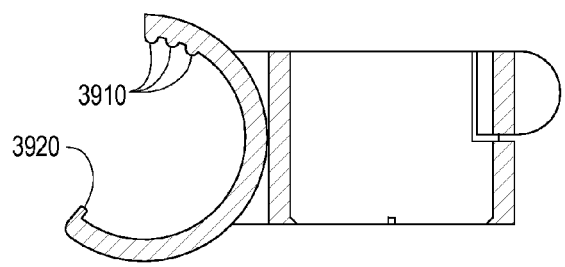

FIG. 51
FIG. 52
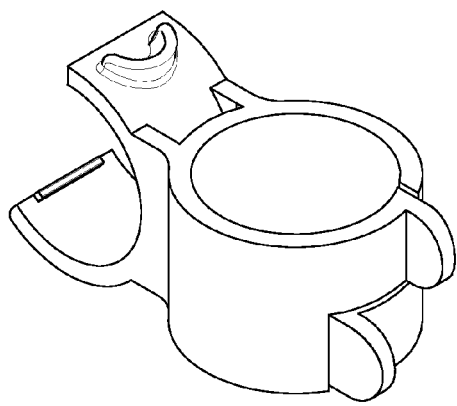
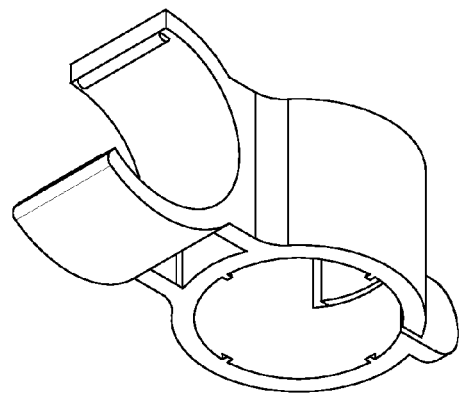
FIG. 53
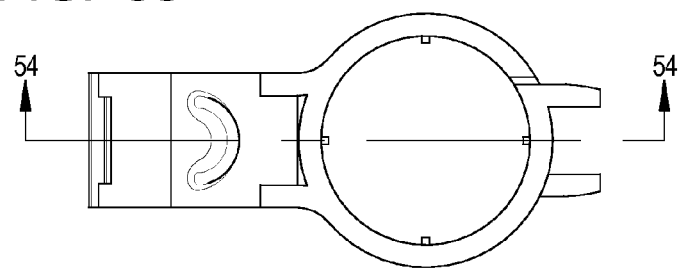
FIG. 54
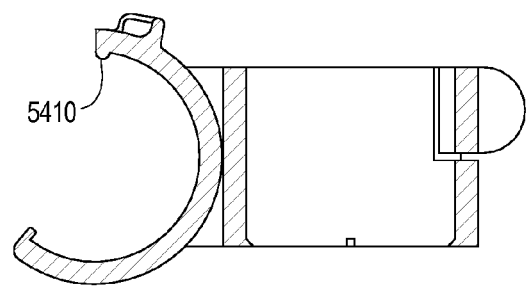

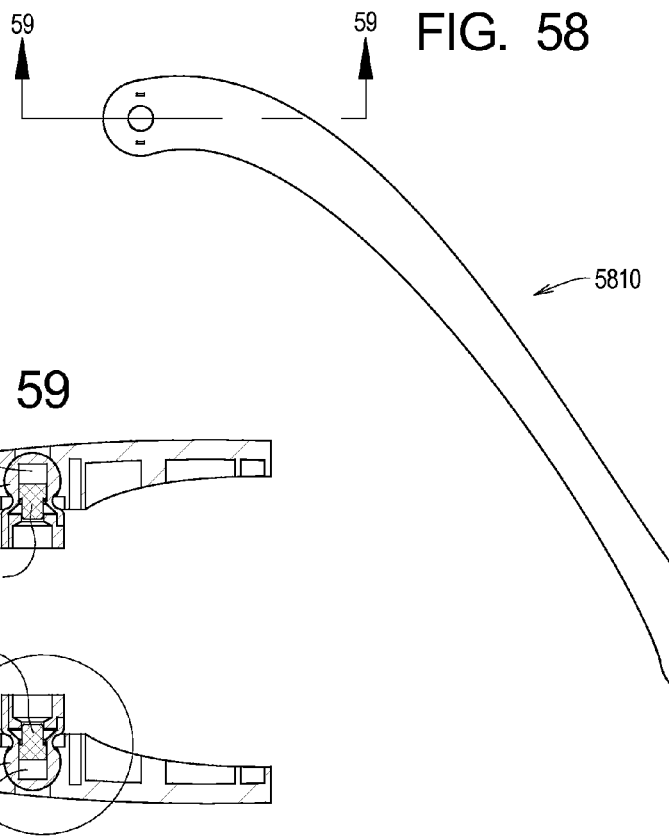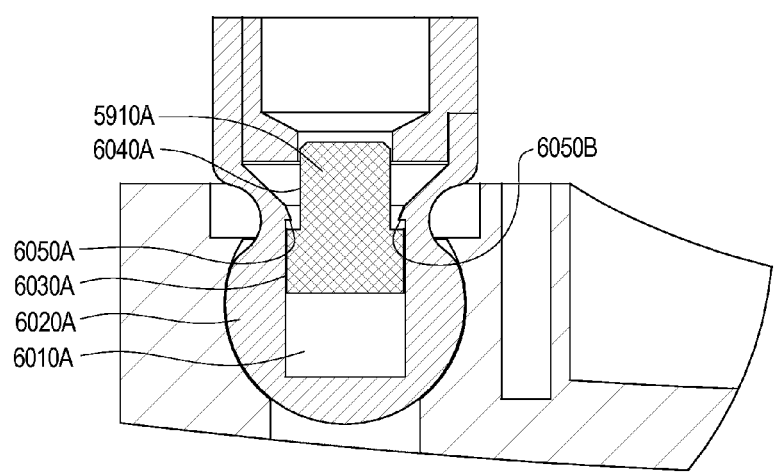

CHALK HOLDING DEVICES FOR BICYCLES, SCOOTERS AND SKATEBOARDS

CROSS-REFERENCE TO RELATED APPLICATIONS

This application claims the benefit of U.S. Provisional Application No. 61/345,593, filed May 17, 2010 and U.S. Provisional Application No. 61/390,180 filed Oct. 5, 2010. The aforementioned applications are incorporated herein by reference in their entireties.

FIELD OF THE INVENTION

The present invention relates generally to bicycles, scooters and skateboards, and accessories for bicycles, scooters and skateboards. More particularly, the present invention relates to chalk holding devices for bicycles, scooters and skateboards.

BACKGROUND OF THE INVENTION

According to the U.S. Department of Health and Human Services Centers for Disease Control and Prevention ("CDC"), being physically active is one of the most important steps that an individual can take to improve one's health. In fact, the CDC has established physical activity guidelines for children and adults.

For example, with respect to children, the CDC recommends at least 60 minutes of physical activity each day for healthy physical, mental and social development. With respect to adults, the CDC recommends a combination of aerobic and muscle-strengthening activities, which may take several hours to complete (see www.cdc.gov).

Unfortunately, many children and adults fail to meet the CDC's physical activity guidelines. This, in combination with poor eating habits (including overeating and/or consuming foods that lack nutritional value), has led to a vast amount of obesity in the U.S. It is well known that obesity is linked to many diseases, including diabetes, coronary heart disease, myocardial infarctions, strokes, kidney failure, liver disease, cancer, arthritis, atherosclerosis and hypertension, among others.

As of January 2009, the U.S. population was estimated to be about 305 million. According to health statistics released in 2009, of the 305 million Americans, over 58 million were overweight. Furthermore, over 40 million Americans were obese and over 3 million Americans were morbidly obese. More than 80 percent of Americans did not engage in adequate physical activity and more than one quarter of all Americans were considered to be "completely sedentary."

Alarmingly, more than 30 percent of American children were obese. More than one quarter of these obese children were showing symptoms of the development of Type II diabetes. Even worse, of those children developing Type II diabetes, more than 60 percent of them were also showing one or more signs of cardiovascular disease.

While there are many outdoor activities in which adults and children may participate, some find certain activities to be boring. Furthermore, even if some activities are interesting to potential participants, some may become discouraged by long set-up times or the requirement of tools to facilitate setting-up an activity.

In view of the above, there is a need to develop devices that increase outdoor activities. Furthermore, there is a need to develop devices that may help to promote exercise by children and/or adults. In addition, there is a need to develop devices that may increase the duration that children and/or adults exercise by making such exercises interesting and/or fun. Even further, there is a need to develop devices that are quick to set-up and may not require tools.

SUMMARY OF THE INVENTION

The present invention is designed to address at least one of the aforementioned problems and/or meet at least one of the aforementioned needs.

Chalk holding devices for bicycles, scooters, skateboards and other wheeled apparatuses are provided. One exemplary embodiment includes a chalk holding device for attachment to a bicycle having a wheel and an axle with a first end and a second end. The chalk holding device has a chalk-receiving member for receiving chalk therein. The chalk holding devices also has first and second arms that extend from the chalk-receiving member towards the axle. The first arm has a first axle cup for receiving a first end of the axle and the second arm has a second axle cup for receiving a second end of the axle.

Objects, features, embodiments and/or advantages of the invention will be apparent from the following specification taken in conjunction with the following drawings.

BRIEF DESCRIPTION OF THE DRAWINGS

FIG. 5 is a top view of the of the chalk holding device of FIG. 3 showing the flexibility of the attachment arms;

FIG. 6 is a cross-sectional view taken along line 6-6 of FIG. 5 showing the chalk holding device attached to a bicycle axle;

FIG. 34 is a cross-sectional view taken along line 34-34 of FIG. 32;

FIG. 35 is a magnified view of the encircled portion of FIG. 34;

FIG. 36 is a top perspective view of the chalk receiving member of the chalk holding device of FIG. 28;

FIG. 37 is a bottom perspective view of the chalk receiving member of the chalk holding device of FIG. 28;

FIG. 38 is a top view of the chalk receiving member of the chalk holding device of FIG. 28;

FIG. 39 is a cross-sectional view taken along line 39-39 of FIG. 38;

FIG. 51 is a top perspective view of the chalk receiving member of the chalk holding device of FIG. 43;

FIG. 52 is a bottom perspective view of the chalk receiving member of the chalk holding device of FIG. 43;

FIG. 53 is a top view of the chalk receiving member of the chalk holding device of FIG. 43;

FIG. 54 is a cross-sectional view taken along line 54-54 of FIG. 53;

FIG. 58 is a left side elevation view another exemplary embodiment of the chalk holding device of the present invention;

FIG. 59 is a sectional view taken along line 59-59 of FIG. 58;

FIG. 60 is a magnified view of the encircled portion of FIG. 59;

DETAILED DESCRIPTION

Figure 1A:
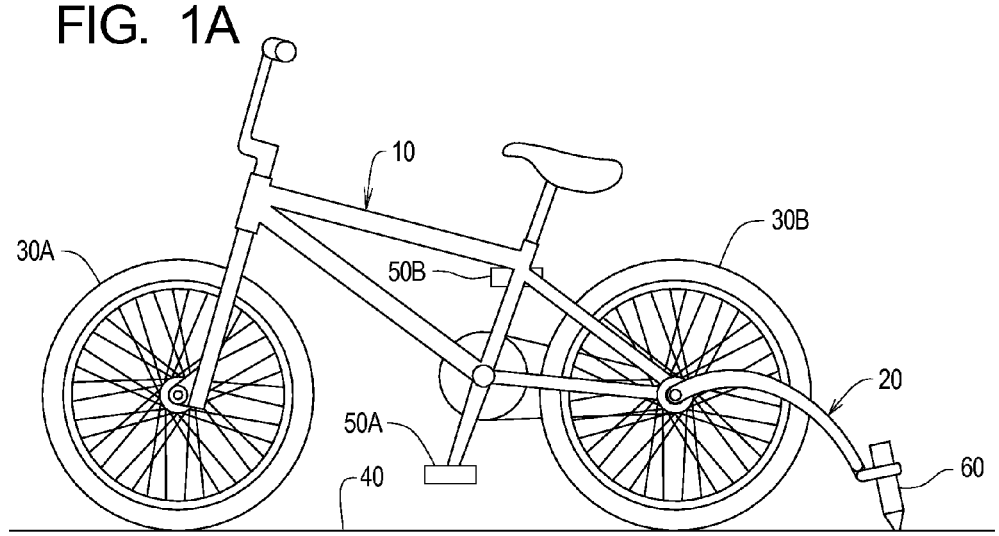
FIG. 1A is a left side elevation view of an exemplary bicycle with an exemplary chalk holding device of the present invention attached thereto.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

FIG. 1A illustrates an exemplary bicycle 10 and a chalk holding device 20 attached thereto. The bicycle 10 has first and second wheels 30A, 30B, which contact a riding surface 40.

For purposes of the present invention, it should be understood that the term bicycle is not limited to a two-wheeled vehicle that is moved by foot pedals (exemplary foot pedals 50A, 50B are shown in FIG. 1A). Instead, the term bicycle includes a vehicle with one or more wheels that is moved by one or more foot pedals. Therefore, for purposes of the present invention, a bicycle includes unicycles and tricycles, among other things.

As shown in FIG. 1A, chalk 60 is received in the chalk holding device 20. FIG. 1A is intended to represent an exemplary configuration when the exemplary chalk 60 is a full piece of chalk that has yet to be used.

Figure 1B:
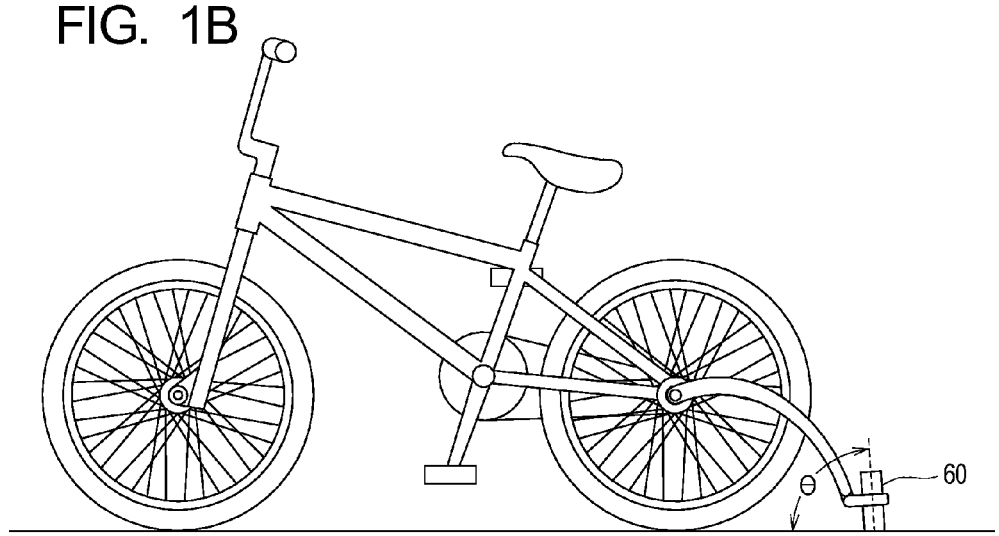
FIG. 1B is a left side elevation view similar to FIG. 1, except that some of the chalk has been worn due to use.

FIG. 1B is a view similar to FIG. 1A, except that some of the chalk 60 has been worn due to use. It should be noted that the angle of the chalk 60 relative to the riding surface 40 changes as the chalk is worn. In one embodiment, the chalk holding device 20 is designed so that the angle θ of the chalk 60 relative to the riding surface 40 (also known as the chalk trailing angle) is always less than 90 degrees. It should be understood, however, that the chalk trailing angle may be equal to or greater than 90 degrees.

Figure 2:
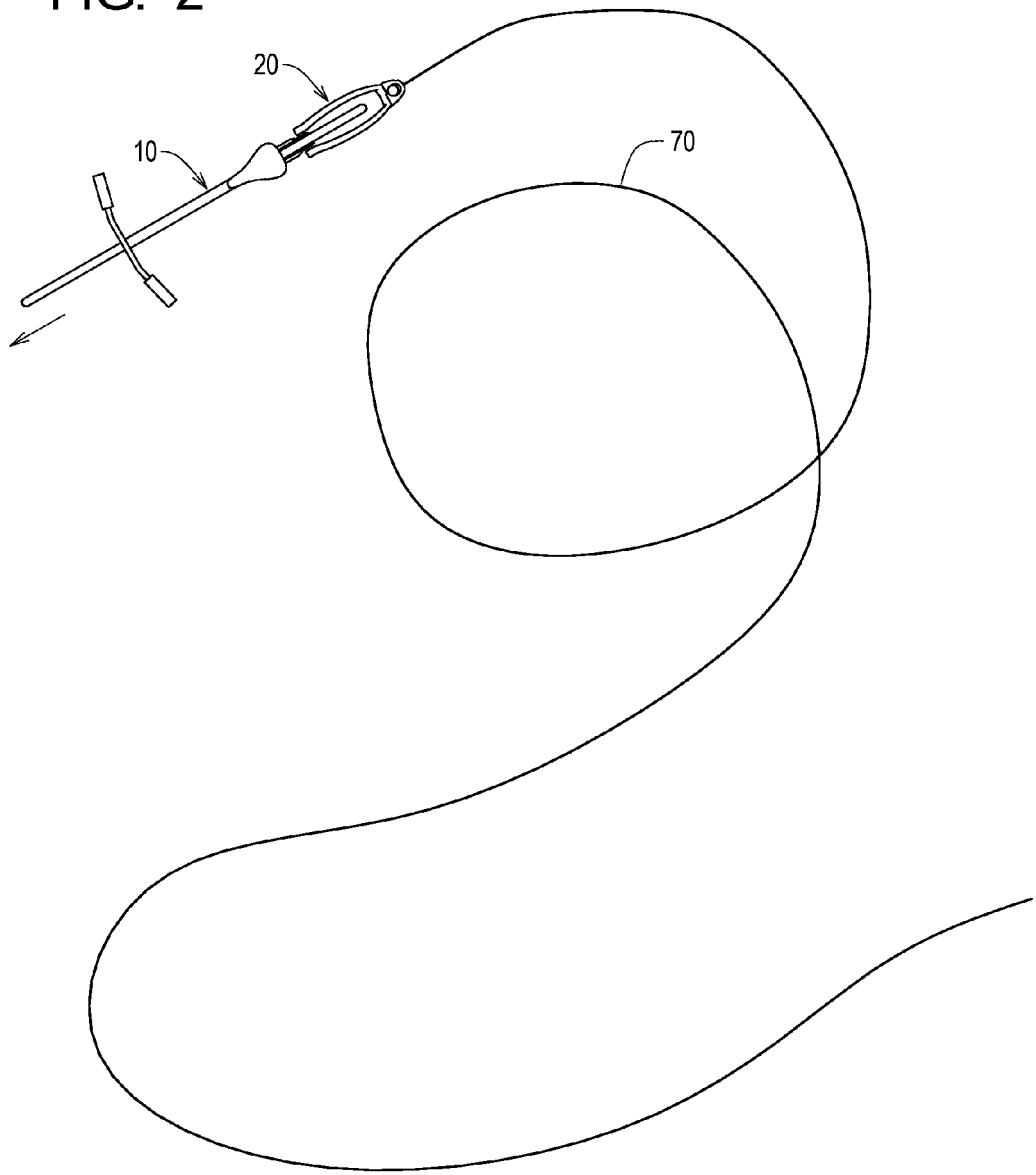
FIG. 2 is top plan view of the bicycle and chalk holding device of FIG. 1 showing a trail of chalk that has been drawn using the exemplary chalk holding device.

FIG. 2 is top view of the bicycle 10 and chalk holding device 20 of FIG. 1A and illustrates a trail 70 of chalk that has been drawn on the riding surface 40 using the chalk holding device 20 by moving the bicycle 10 relative to the riding surface 40. Of course, as the trail 70 of chalk is drawn, the chalk 60 wears.

Figure 3:
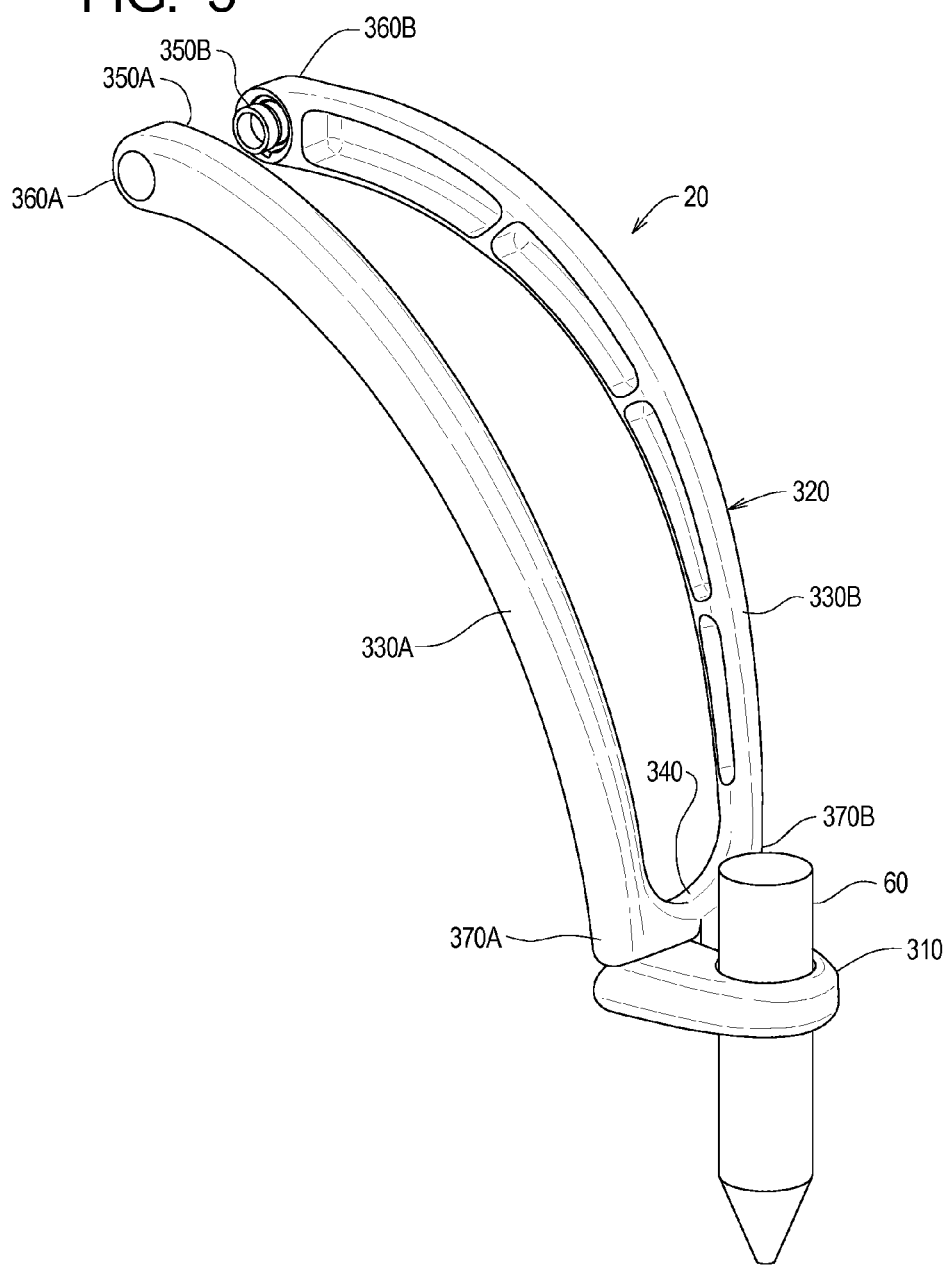
FIG. 3 is a perspective view of an exemplary embodiment of the chalk holding device of the present invention.

FIG. 3 is a perspective view of an exemplary embodiment of the chalk holding device 20 of the present invention having a piece of chalk 60 received therein. More specifically, chalk holding device 20 includes chalk receiving member 310 and arm assembly 320.

In one embodiment, arm assembly 320 includes first arm 330A and second arm 330B, which may be integrally connected to one another by way of a transition region 340. In one embodiment, first arm 330A and/or second arm 330B are connected to chalk receiving member 310 either directly or via transition region 340. In one embodiment, first arm 330A and/or second arm 330B are integral with chalk receiving member 310.

In one embodiment, the first arm 330A includes a first axle cup 350A and the second arm 330B includes a second axle cup 350B. As shown in FIG. 3, the first and second axle cups 350A, 350B are respectively located near first ends 360A, 360B of the arms 330A, 330B, while second ends 370A, 370B of the arms 330A, 330B are respectively located near the chalk receiving member 310.

Figure 4:
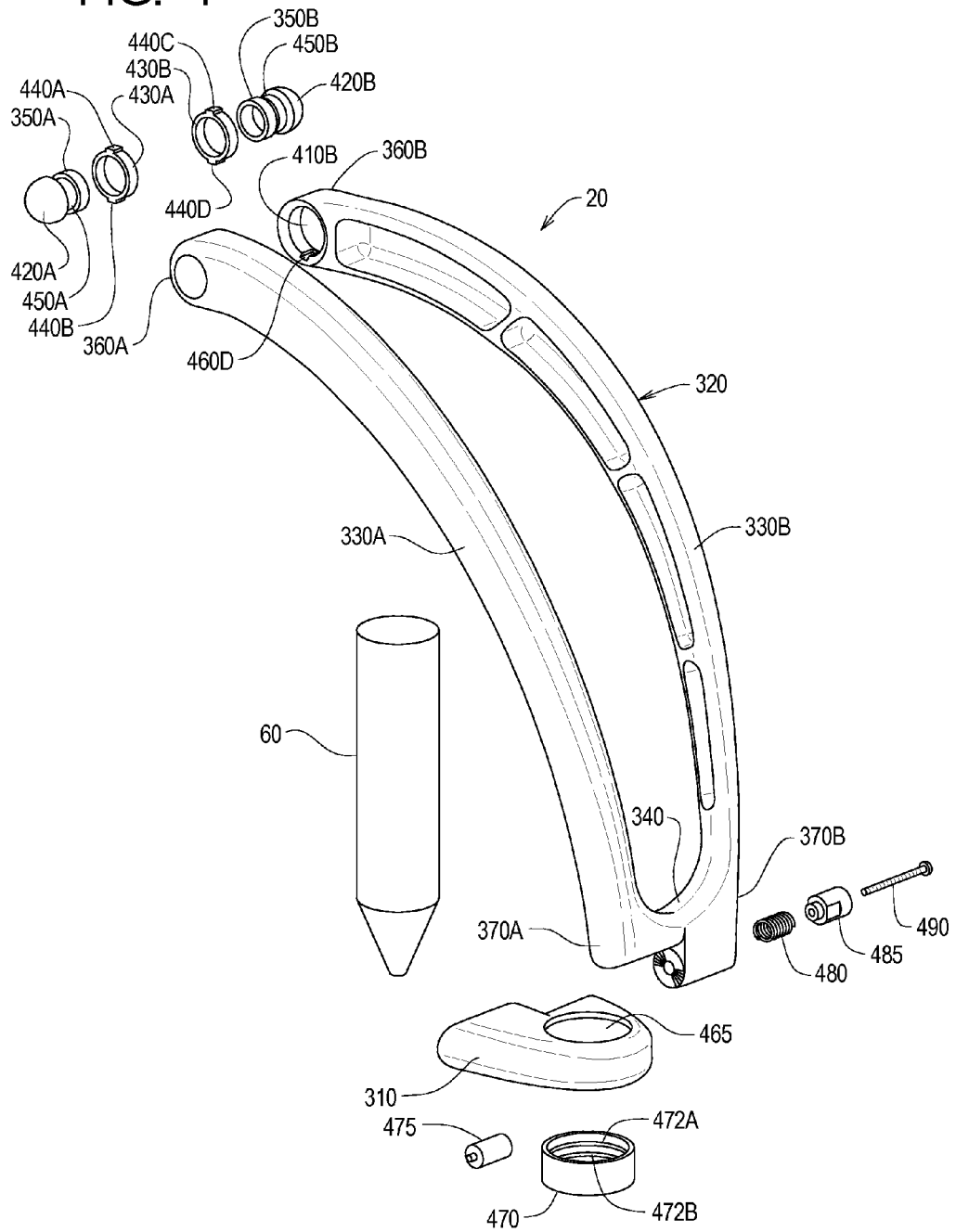
FIG. 4 is an exploded perspective view of the chalk holding device of FIG. 3.

FIG. 4 is an exploded perspective view of the chalk holding device 20 of FIG. 3, along with a piece of chalk 60. With reference to FIG. 4, first arm 330A of arm assembly 320 includes first socket 410A (not shown) near its first end 360A and second arm 330B of arm assembly 320 includes second socket 410B near its first end 360B. First and second sockets 410A, 410B are designed to respectively receive first and second balls 420A, 420B that are respectively connected to first and second axle cups 350A, 350B. Accordingly, each of first and second balls 420A, 420B and first and second sockets 410A, 410B respectively form a ball-and-socket joint.

Advantageously, the ball-and-socket joints allow the first and second axle cups 350A, 350B to pivot in an infinite number of directions, so as to assist in connecting the chalk holding device 20 to a variety of different bicycles. For example, wheel axle bolts may be spaced apart from about 4½ inches to 6½ inches (although other sizes are possible) and can be accommodated by the present invention.

In order to retain each of the first and second balls 420A, 420B in respective first and second sockets 410A, 410B, in one embodiment, first and second retaining rings 430A, 430B are provided. First retaining ring 430A includes first and second protrusions 440A, 440B. Similarly, second retaining ring 430B includes first and second protrusions 440C, 440D. In addition, relatively narrow intermediate regions 450A, 450B are respectively provided between first ball 420A and first axle cup 350 and between second ball 420B and second axle cup 350B. Furthermore, first and second slots 460A, 460B (not shown) are provided near first socket 410A and third and fourth slots 460C (not shown), 460D are provided near second socket 410B.

To form a connection between first ball 420A and first socket 410A, first ball 420A is inserted into first socket 410A. First retaining ring 430A, which has an inner diameter that is greater than the outer diameter of first axle cup 350A, is slid over the first axle cup 350A. First and second protrusions 440A, 440B of the first retaining ring 430A are aligned with first and second slots 460A, 460B as retaining ring 430A is slid over intermediate region 450A. The first retaining ring 430A has an inner diameter that is less than the outer diameter of the first ball 420A. Thus, when first and second protrusions 440A, 440B are respectively received within first and second slots 460A, 460B, retaining ring 430A retains first ball 420A within first socket 410A. A similar technique is used to form a connection between second ball 420B and second socket 410B.

There are several ways to maintain the retaining ring in position. For example, this can be accomplished using a snap lock, an adhesive or by ultrasonic welding. In one embodiment, the retaining ring is held by a permanent bond, so that a user cannot easily remove it.

It should be understood that the configuration of the ball and socket of the ball-and-socket joint may be reversed. That is, in one embodiment, a ball may be provided near the first ends 360A, 360B of each of the first and second arms 330A, 330B and corresponding sockets associated with each of the first and second axle cups 350A, 350B may be designed to receive the balls. The present invention is intended to cover such configurations.

With reference still to FIG. 4, chalk 60 is received in chalk receiving member 310. More specifically, chalk receiving member 310 includes an aperture 465 and a bushing 470 therein. In one embodiment, the bushing 470 is made of rubber, although other materials are possible and anticipated.

In one embodiment, the bushing 470 includes one or more grooves (see, e.g., first and second grooves 472A, 472B).

Chalk 60 is pushed through the aperture 465 and is engaged by the bushing 470, so that it is snugly grasped. In one embodiment, the chalk 60 is not automatically fed out of the bottom of the chalk retaining member 310. Instead, the chalk 60 is pushed through the aperture 465 by a user to a desired position (see, e.g., FIGS. 1A, 1B and 3). As the chalk 60 becomes worn, a user may push more of it through the aperture 465.

For completeness, FIG. 4 also shows a roller 475, a spring 480, a button 485 and a screw 490. These features will be described in connection with other figures.

Referring to FIGS. 5 and 6, the chalk holding device 20 is designed to be connected to a variety of bicycles. In one embodiment, the chalk holding device 20 relies on the resilience of the material with which it is constructed to aid in being easily connected to or disconnected from a bicycle. In one embodiment, no tools are required to connect the chalk holding device 20 to and disconnect the chalk holding device 20 from a bicycle. In one embodiment, the chalk holding device includes a material that is resilient, flexible and/or has memory. In one embodiment, the chalk holding device 20 is made out of at least one of ABS, Nylon or rubber, although other materials are possible and anticipated.

More specifically, FIG. 5 illustrates, in solid lines, first end 360A of first arm 330A and first end 360B of second arm 330B in an initial, unflexed position. FIG. 5 also illustrates, in dashed lines, first end 360A' of first arm 330A' and first end 360B' of second arm 330B' in a flexed position. By moving the chalk holding device 20 from an unflexed position to a flexed position, the distance between first axle cup 350A and second axle cup 350B is increased, so as to allow connection to and disconnection from a bicycle wheel axle, as will be described in connection with FIG. 6.

With reference to FIG. 5, it should be noted that, when the chalk holding device 20 is in an unflexed position, the axes of the first axle cup 350A and the second axle cup 350B substantially align with one another. However, when the chalk holding device 20 is in a flexed position, in the absence of allowing the first axle cup 350A' and the second axle cup 350W to pivot, the axes of the first axle cup 350A' and the second axle cup 350W would be misaligned. In one embodiment, the first axle cup 350A and second axle cup 350B are able to maintain alignment of their axes over a plurality of flexed positions due to the ball-and-socket connection between the first and second axle cups 350A, 350B and the first and second arms 330A, 330B, respectively.

FIG. 6 is a cross-sectional view taken along line 6-6 of FIG. 5 showing a portion of the chalk holding device 20 attached to a portion of a bicycle 10. Specifically, FIG. 5 shows first end 360B of second arm 330B, second axle cup 350B, second ball 420B received within second socket 410B (not numbered in the figure), second retaining ring 430B, intermediate region 450B associated with second ball 420B, recess 610B in second ball 420B, second portion of wheel axle 620B and second axle nut 630B. In one embodiment, similar components correspond to the arm 330A of the chalk holding device 20.

As shown in FIG. 6, second portion of wheel axle 620B is received within recess 610B in second ball 420B. The recess 610B is sufficiently deep to accommodate various-sized second portions of wheel axle 620B.

Furthermore, second axle nut 630B is received by second axle cup 350B. In one embodiment, the second axle cup 350B has a circular cross-section, so that second axle nut 630B can be received therein, but is not lockingly engaged. In another embodiment, the cross-section of the second axle cup 350B substantially matches the cross-section of the second axle nut 630B, so as to prevent rotation of the second axle cup 350B relative to the second axle nut 630B. Other cross-sectional shapes of the second axle cup 350B are possible and anticipated.

Figure 7:
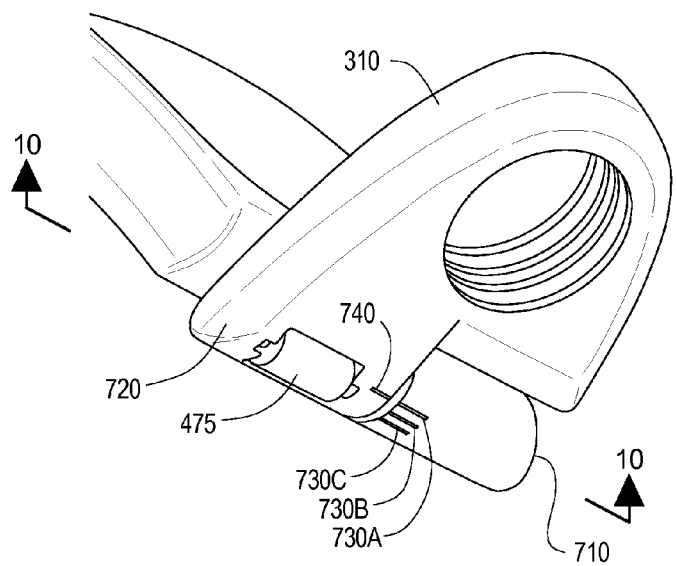
FIG. 7 is a perspective view of a chalk receiving member, roller, portion of an arm assembly, an angle adjustment index and angle adjustment registration marks of the embodiment of the chalk holding device shown in FIG. 1.

FIG. 7 is a perspective view of a portion of the chalk holding device 20 that faces the riding surface 40 (see FIG. 1). In order to accommodate bicycles having a variety of wheel diameters, the chalk receiving member 310 is pivotable relative to the arm assembly 320. This may be accomplished using a variety of techniques.

FIGS. 7-14 illustrate an exemplary technique for pivoting the chalk receiving member 310 relative to the arm assembly 320 and for setting a plurality of adjustment angles. More specifically, in one embodiment, the second arm 330B includes an arm extension 710 and the chalk receiving member 310 includes an extension member 720.

The arm extension 710 includes angle adjustment registration marks 730A, 730B, 730C. The chalk receiving member 310 includes angle adjustment index 740, which corresponds with the angle adjustment registration marks 730A, 730B, 730C to indicate the angle of the chalk receiving member 310 relative to the arm assembly 320 (or arm extension 710).

The angle adjustment registration marks 730A, 730B, 730C may include indicia that correspond with various wheel sizes, so that a user may adjust the angle of the chalk receiving member 310 to accommodate such wheel sizes. For example, angle adjustment registration mark 730A may correspond with 26 inch and 29 inch diameter wheel sizes; angle adjustment registration mark 730B may correspond with 20 inch and 24 inch diameter wheel sizes; and, angle adjustment registration mark 730C may correspond with 12 inch and 16 inch diameter wheel sizes. As another alternative, the indicia may simply state large, medium and small (or abbreviations therefor, e.g., L, M and S). Of course, more than three adjustment angles may be provided. Furthermore, the location of the indicia may be moved to a different position, such as to a position viewable from the top of the chalk holding device 20.

Figure 8:
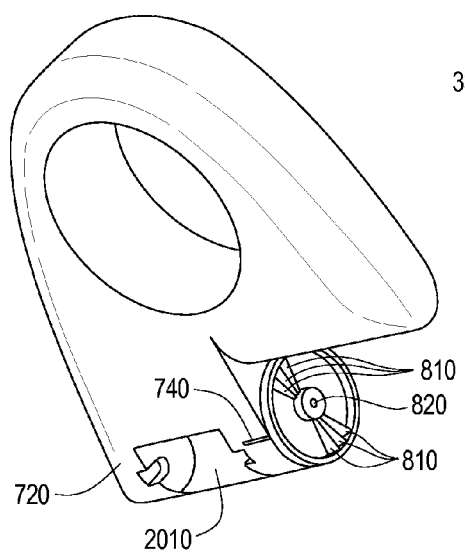
FIG. 8 is a perspective view showing the chalk receiving member with angle adjustment teeth, a roller socket and an angle adjustment index.
Figure 9:
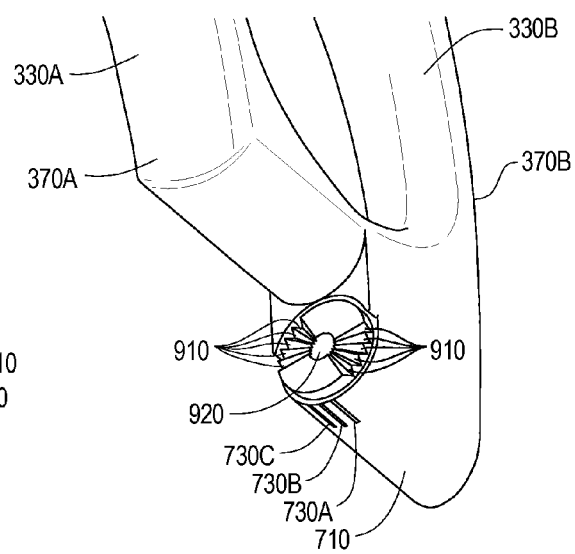
FIG. 9 is a perspective view showing an extension member with angle adjustment teeth and angle adjustment registration marks.

As shown in FIGS. 8 and 9, in order to set the angle between the extension member 720 of chalk receiving member 310 and the arm extension 710 of the second arm 330B, the extension member 720 includes first set of angle adjustment teeth 810 and the arm extension 710 includes corresponding second set of angle adjustment teeth 910. In one embodiment, the first set of adjustment teeth 810 and the second set of adjustment teeth 910 are moved apart from one another, so as to become disengaged. Then, chalk receiving member 310 is rotated about pivot point 820, which corresponds with pivot point 920 of the extension member 710. The first set of adjustment teeth 810 and the second set of adjustment teeth 910 are permitted to become reengaged at a new angle.

Figure 10:
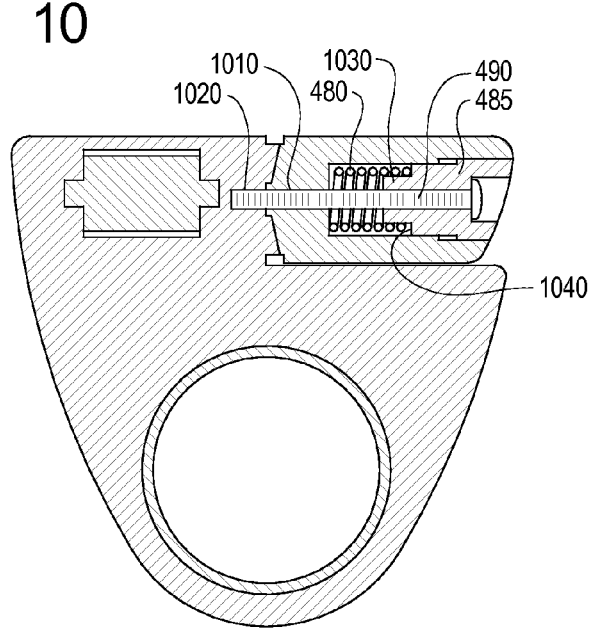
FIG. 10 is a cross-sectional view taken along line 10-10 of FIG. 7 showing an angle adjustment tension assembly.

FIGS. 4 and 10 illustrate how the first set of adjustment teeth 810 and second set of adjustment teeth 910 become both disengaged and reengaged. The screw 490 passes through the button 485, the spring 480 and an aperture 1010 in arm extension 710, without being threaded therethrough. However, the spring 480 is threaded into an opening 1020 in the extension member 720. The button 485 may include a neck 1030 and a shoulder 1040 to maintain alignment of the spring 480, among other things.

When the spring 480 is in its relaxed (expanded) configuration, the spring 480 biases the arm extension 710 and the extension member 720 towards one another. This causes the first set of adjustment teeth 810 and the second set of adjustment teeth 910 to remain engaged.

To disengage the first set of adjustment teeth 810 and the second set of adjustment teeth 910, a user merely grips the second end 370B of the second arm 330B and pulls it in a direction away from the second end 370A of the first arm 330A, while pressing the button 485 with one's thumb towards the opening 1020 in the extension member 720. This causes the spring 480 to compress, which creates room for the first set of adjustment teeth 810 and the second set of adjustment teeth 910 to become disengaged. The user then adjusts the angle of the chalk receiving member 310 relative to the arm extension 710.

To reengage the first set of adjustment teeth 810 and the second set of adjustment teeth 910, after chalk receiving member 310 has been adjusted to an appropriate angle relative to the arm extension 710, the user releases his thumb from the button 485. The user may also simultaneously cease the force being applied to pull the second end 370B of the second arm 330B away from the second end 370A of the first arm 330A.

Figure 11:
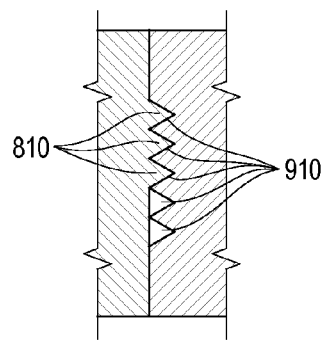
FIG. 11 is a sectional view showing angle adjustment teeth engaged in a first position.
Figure 12:
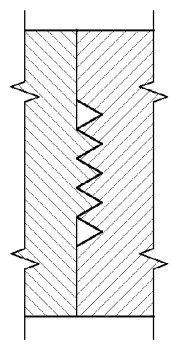
FIG. 12 is a sectional view showing angle adjustment teeth engaged in a second position.
Figure 13:
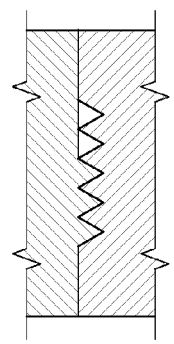
FIG. 13 is a is a sectional view showing angle adjustment teeth engaged in a third position.

FIG. 11 is a sectional view showing the first set of angle adjustment teeth 810 engaged with the second set of angle adjustment teeth 910 in a first position. FIG. 12 is a sectional view showing the first set of angle adjustment teeth 810 engaged with the second set of adjustment teeth 910 in a second position. FIG. 13 is a sectional view showing the first set of adjustment teeth 810 engaged with the second set of adjustment teeth 910 in a third position.

Figure 14:
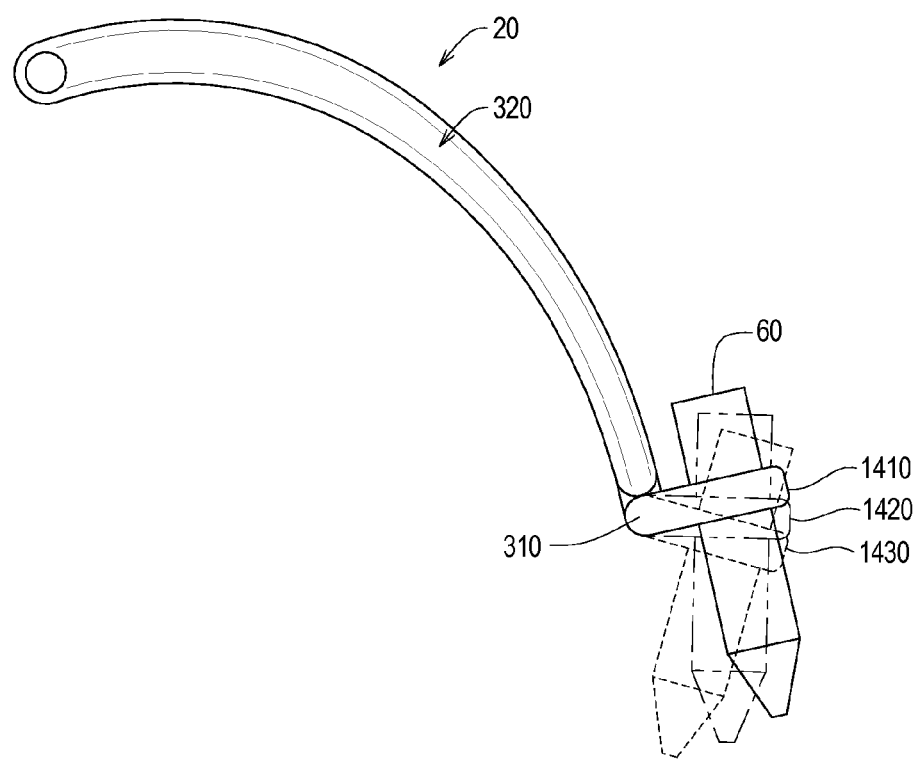
FIG. 14 is a left side elevation view of the chalk holding device of FIG. 1 showing three exemplary angles at which the chalk may be set.

FIG. 14 is a left side elevation view of the chalk holding device 20 of FIG. 1 showing three exemplary angles at which the chalk 60 may be set. In one embodiment, the chalk receiving member 310 may be set at angles relative to arm assembly 320 that correspond with positions 1410, 1420 and 1430. As an example, position 1410 may be appropriate for bicycles with 26 inch and 29 inch diameter wheels; position 1420 may be appropriate for bicycles with 20 inch and 24 inch diameter wheels; and, position 1430 may be appropriate for bicycles with 12 inch and 16 inch diameter wheels.

Figure 15:
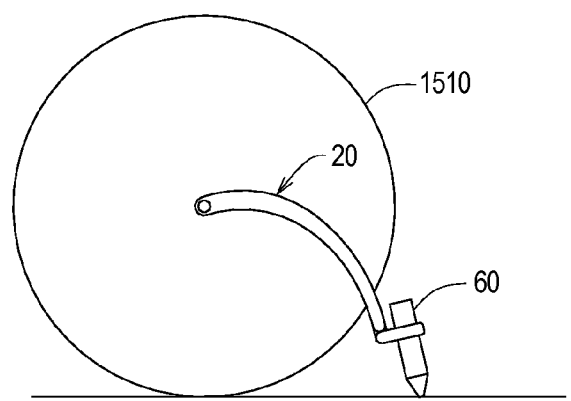
FIG. 15 is a schematic left side elevation view of the device in use with a 26 inch wheel.
Figure 16:
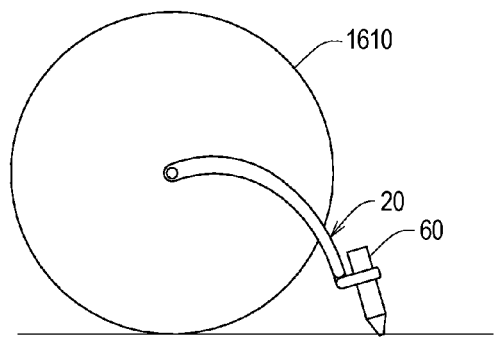
FIG. 16 is a schematic left side elevation view of the device in use with a 24 inch wheel.
Figure 17:
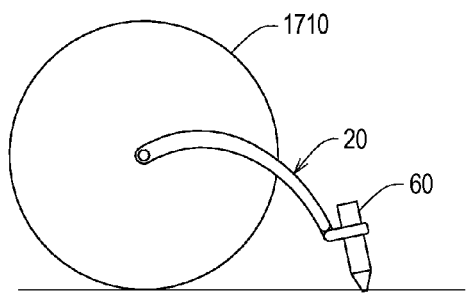
FIG. 17 is a schematic left side elevation view of the device in use with a 20 inch wheel.
Figure 18:
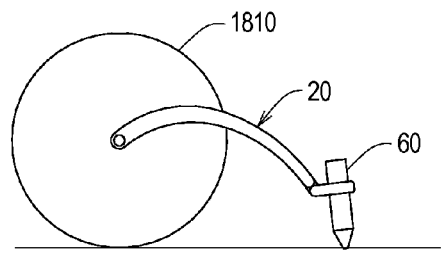
FIG. 18 is a schematic left side elevation view of the device in use with a 16 inch wheel.
Figure 19:
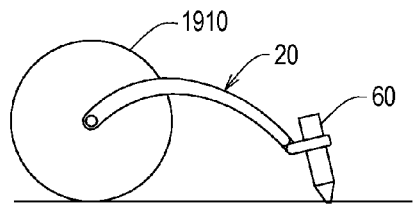
FIG. 19 is a schematic left side elevation view of the device in use with a 12 inch wheel.

FIG. 15 is a schematic left side elevation view of the chalk holding device 20 in use with a 26 inch diameter wheel 1510. FIG. 16 is a schematic left side elevation view of the chalk holding device 20 in use with a 24 inch diameter wheel 1610. FIG. 17 is a schematic left side elevation view of the chalk holding device 20 in use with a 20 inch diameter wheel 1710. FIG. 18 is a schematic left side elevation view of the chalk holding device 20 in use with a 16 inch diameter wheel 1810. FIG. 19 is a schematic left side elevation view of the chalk holding device 20 in use with a 12 inch diameter wheel 1910. The chalk holding device may be used with wheels of other diameters (e.g., 29 inch diameter wheels, among others).

Figure 20:
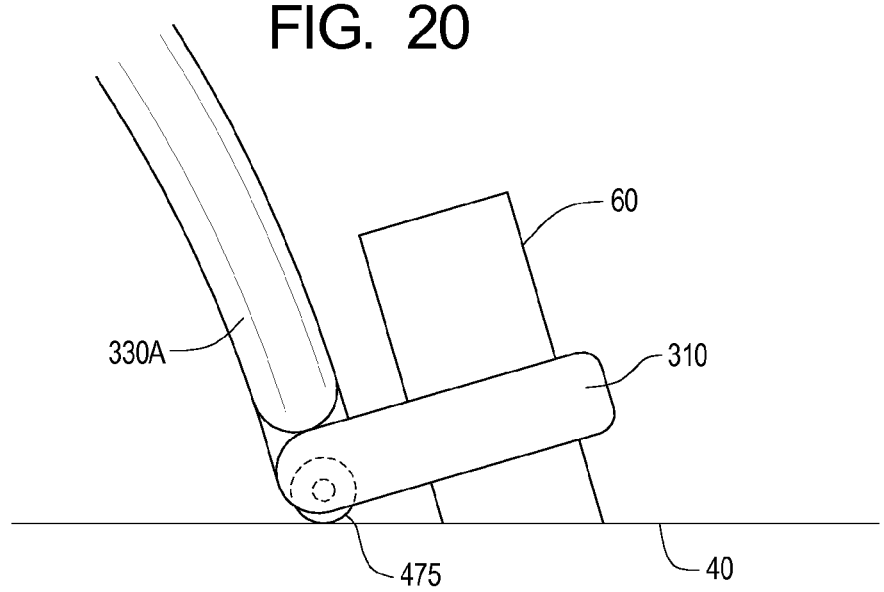
FIG. 20 is a left side elevation view of chalk worn to a point where device protection roller engages the ground.

With reference to FIG. 20, as chalk 60 is sufficiently spent through use of the chalk holding device 20, the device may come into contact the riding surface 40. In order to protect the chalk holding device 20 from being damaged in such situations, a roller 475 may be provided, as described with reference to FIGS. 4, 7, 8, 10 and 20.

Specifically, roller 475 may be received within roller socket 2010 (see FIGS. 7 and 8). The roller 475 is mounted in roller socket 2010 in an appropriate fashion to allow it to roll when it contacts the riding surface 40.

Instead of using a roller 475, a skid plate (not shown) made of a hard and durable material may be used.

Figure 21:
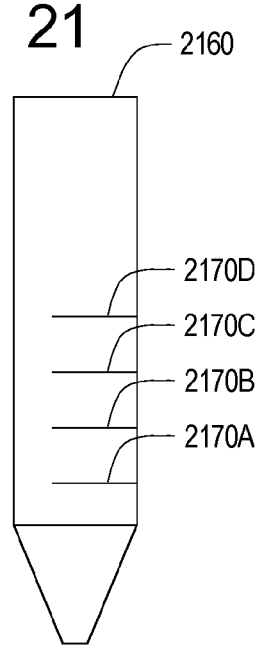
FIG. 21 is a side elevation view of chalk including marks to indicate a distance or time traveled.

FIG. 21 is a side elevation view of specialized chalk 2160 which may be used with the present invention. The specialized chalk 2160 includes marks 2170A, 2170B, 2170C and 2170D to show approximate distance traveled. The specialized chalk may be sold with a chart (not shown), which indicates a distance traveled based upon a surface upon which the user was riding.

For example, if the user was riding on sidewalk and had used chalk 2160 from line 2170A to line 2170B, the chart may indicate that the user had traveled one-quarter of a mile. As another example, if the user was riding on pavement and had used chalk 2160 from line 2170A to line 2170B, the chart may indicate that the user had traveled half a mile. In one embodiment, the chart may be attached to or form part of the chalk holding device 20.

In addition or as an alternative to providing marks 2170A, 2170B, 2170C, 2170D, the specialized chalk 2160 may be multicolored to indicate an approximate distance traveled. This may also be helpful in motivating users to ride a certain distance.

For example, a user may be instructed to (or decide to) ride until chalk turned from a first color to a second color. Once the color changed, the user would know he had reached a halfway point and would simply turn around and ride back to his starting location. The user could view the trail of chalk that he made on his return trip, which may make the user's return trip more interesting.

Figure 22:
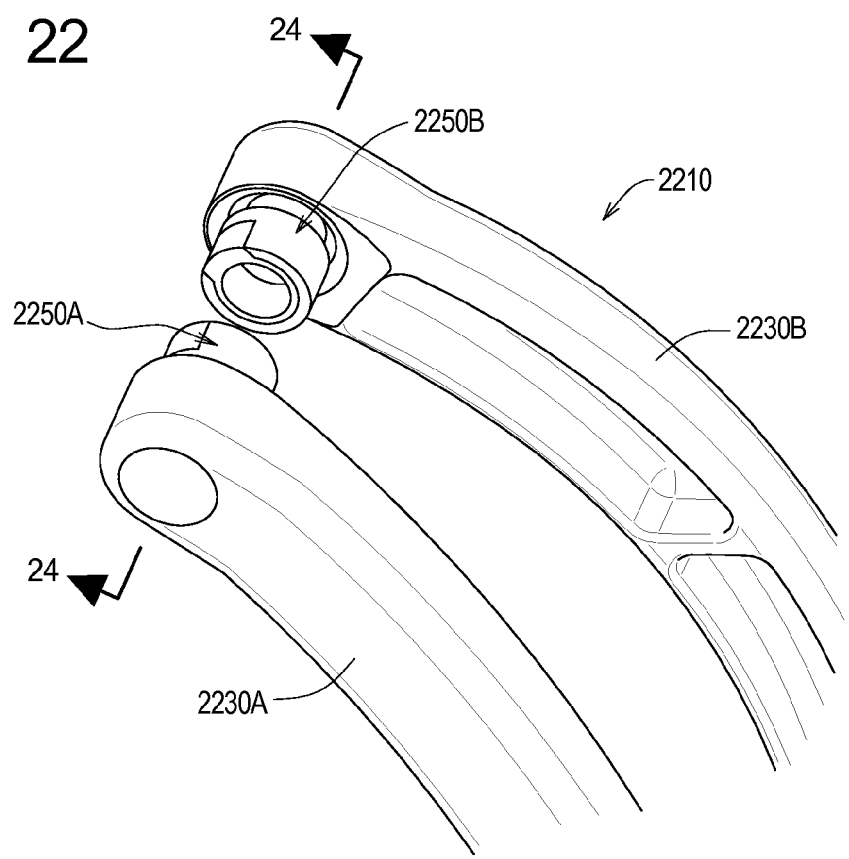
FIG. 22 is a perspective view of a portion of another exemplary embodiment of the chalk holding device of the present invention.

FIG. 22 is a perspective view of a portion of another exemplary embodiment of the chalk holding device 2210 of the present invention. FIG. 22 illustrates a portion of first arm 2230A, a portion of second arm 2230B, a first axle cup assembly 2250A and a second axle cup assembly 2250B. The first and second axle cup assemblies 2250A, 2250B have a maximum diameter that is generally larger than the first and second axle cup assemblies 350A, 350B shown in FIGS. 3-6. The embodiment shown in FIGS. 22-24 is useful for accommodating wheel axles that include a quick release (not shown) instead of (or in addition to) a nut and/or axle nuts used with BMX bicycles, which are generally larger than standard axle nuts.

Figure 23:
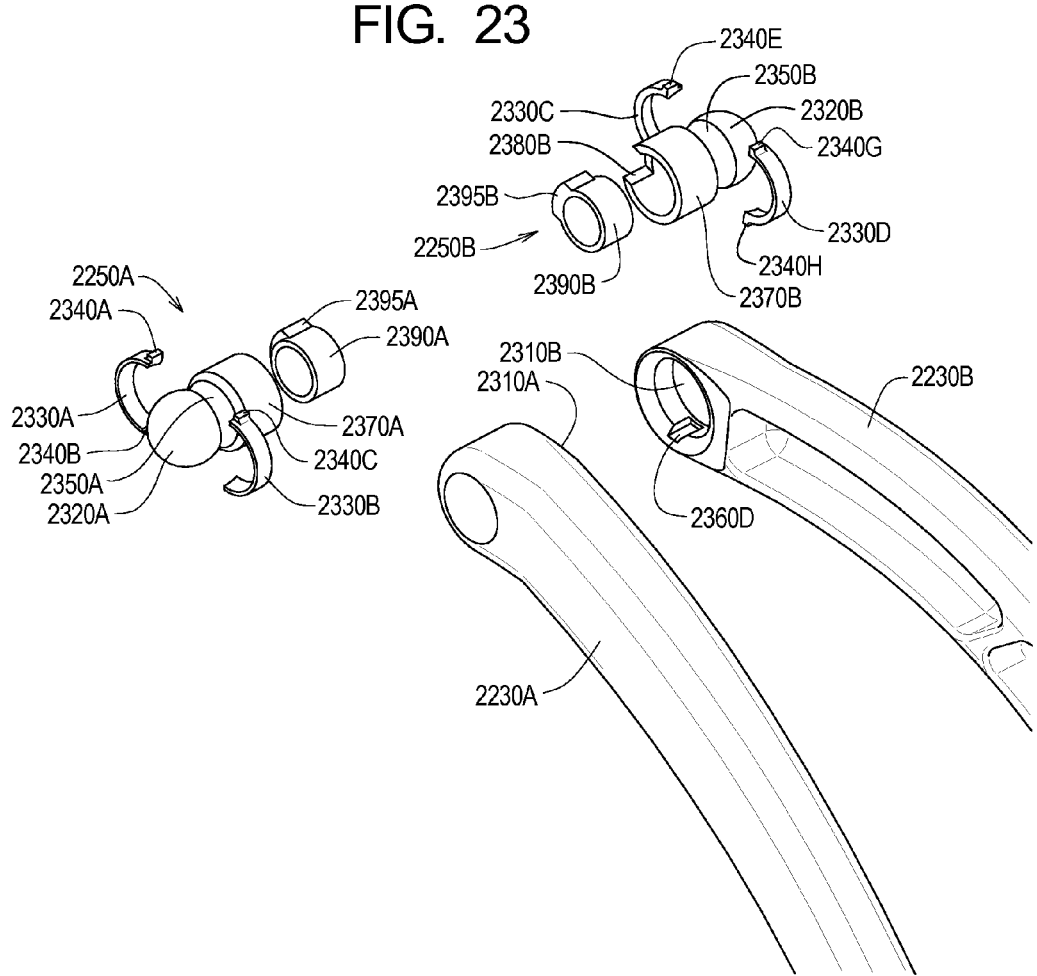
FIG. 23 is an exploded perspective view of the chalk holding device of FIG. 22.
Figure 24:
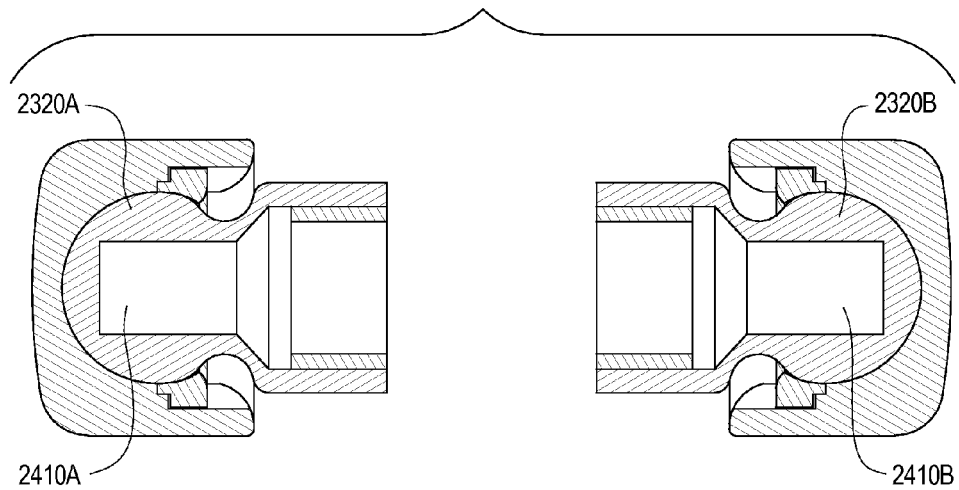
FIG. 24 is a sectional view taken along line 24-24 of FIG. 22.

FIG. 23 is an exploded perspective view of the chalk holding device 2210 of FIG. 22. The first arm 2230A includes first socket 2310A (not shown) and second arm 2230B includes second socket 2310B. First and second sockets 2310A, 2310B are designed to respectively receive first and second balls 2320A, 2320B, which are respectfully attached to first and second main axle cups 2370A, 2370B. Accordingly, each of first and second balls 2320A, 2320B and first and second sockets 2310A, 2310B respectively form a ball-and-socket joint. Advantageously, this allows the first and second main axle cups 2370A, 2370B to pivot in an infinite number of directions, so as to assist in connecting the chalk holding device 2210 to a variety of different bicycles.

In order to retain each of the first and second balls 2320A, 2320B in respective first and second sockets 2310A, 2310B, in one embodiment, multipart retaining rings are provided. In contrast to the embodiment shown in FIG. 4, the multipart retaining rings shown in FIG. 23 have an inner diameter that is smaller than the outer diameter of the first and second main axle cups 2370A, 2370B and, therefore, cannot be slid over same during assembly. Accordingly, the first multipart retaining ring includes a first portion 2330A and a second portion 2330B. Similarly, the second multipart retaining ring includes a first portion 2330C and a second portion 2330D.

The first portion 2330A of the first multipart retaining ring includes first and second protrusions 2340A, 2340B. The second portion 2330B of the first multipart retaining ring includes third and fourth protrusions 2340C, 2340D. The first portion 2330C of the second multipart retaining ring includes fifth and sixth protrusions 2340E, 2340F. The second portion 2330D of the second multipart retaining ring includes seventh and eighth protrusions 2340G, 2340H.

Relatively narrow intermediate regions 2350A, 2350B are respectively provided between first ball 2320A and first main axle cup 2370A and between second ball 2320B and second main axle cup 2370B. Furthermore, first and second slots 2360A, 2360B (not shown) are provided near first socket 2310A and third and fourth slots 2360C (not shown), 2360D are provided near second socket 2310B.

To form a connection between first ball 2320A and first socket 2310A, first ball 2320A is inserted into first socket 2310A. First and second portions 2330A, 2330B of first multipart retaining ring are placed around the intermediate region 2350A. In one embodiment, once the first multipart retaining ring has been placed around intermediate region 2350A, protrusions 2340A and 2340C are designed to engage one another, as are protrusions 2340B and 2340D, so to form a continuous retaining ring. Then, protrusions 2340A, 2340C are placed into slot 2360A, while protrusions 2340B and 2340D are placed into slot 2360B.

In one embodiment, the protrusions 2340A and 2340C do not engage one another, but are merely placed next to each other prior to insertion into their respective slot 2360A. Similarly, protrusions 2340B, 2340D do not engage one another, but are merely placed next to each other prior to insertion into their respective slot 2360B. Accordingly, in this embodiment, the slots 2360A, 2360B would assist in maintaining the positions of the first portion 2330A and the second portion 2330B of the first multipart retaining ring relative to one another.

The first multipart retaining ring has an inner diameter that is less than the outer diameter of the first ball 2320A. Thus, first multipart retaining ring retains first ball 2320A within first socket 2310A. A similar technique is used to form a connection between second ball 2320B and second socket 2310B.

The first main axle cup 2370A includes a first cutout 2380A and the second main axle cup 2370B includes a second cutout 2380B. The first and second cutouts 2380A, 2380B are each sized to provide room for a portion of a quick release system to fit therein, so that the chalk holding device 2210 can be used with bicycles that include a quick release system.

In one embodiment, the diameter of each of the first main axle cup 2370A and the second main axle cup 2370B are sufficient to accommodate wheel axle nuts of BMX bicycles. In one embodiment, first and second axle cup inserts 2390A, 2390B are provided and are designed to be received by the first and second main axle cups 2370A, 2370B, respectively. Accordingly, first and second axle cup inserts 2390A, 2390B have a smaller diameter than first and second main axle cups 2370A, 2370B, so as to more snugly receive wheel axle nuts of most bicycles (e.g., non-BMX bicycles). In one embodiment, first and second axle cup inserts 2390A, 2390B include respective first and second axle cup projections 2395A, 2395B, which generally correspond in size to the first and second cutouts 2380A, 2380B, so as to fill same.

FIG. 24 is a sectional view taken along line 24-24 of FIG. 22. FIG. 24 illustrates that first ball 2320A includes a first recess 2410A and second ball 2320B includes a second recess 2410B. The first and second recesses 2410A, 2410B are designed to receive first and second wheel axles (not shown) therein.

Figure 25:
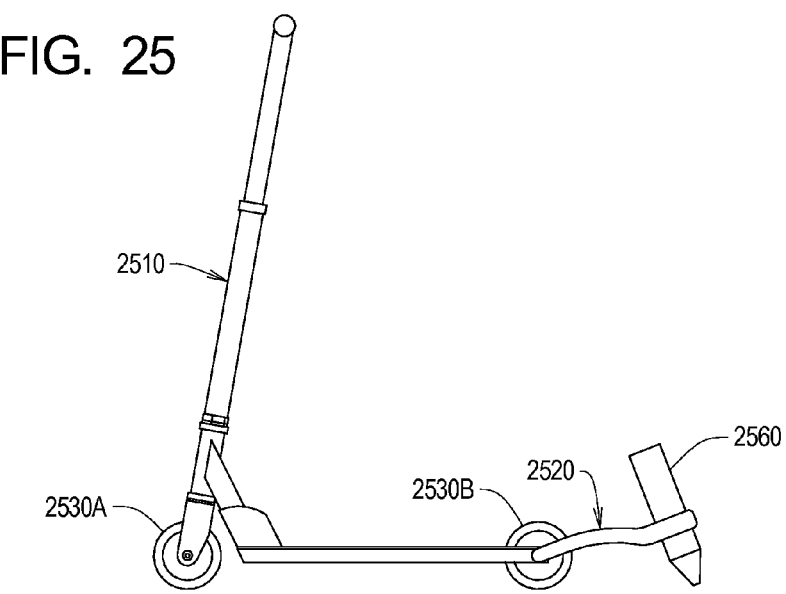
FIG. 25 is a left side elevation view of an exemplary scooter with another exemplary chalk holding device of the present invention attached thereto.

FIG. 25 is a left side elevation view of an exemplary scooter 2510 with another exemplary chalk holding device 2520 of the present invention attached thereto. The scooter 2510 has a first wheel 2530A and a second wheel 2530B. FIG. 25 also shows chalk 2560 inserted in the chalk holding device 2520.

Figure 26:
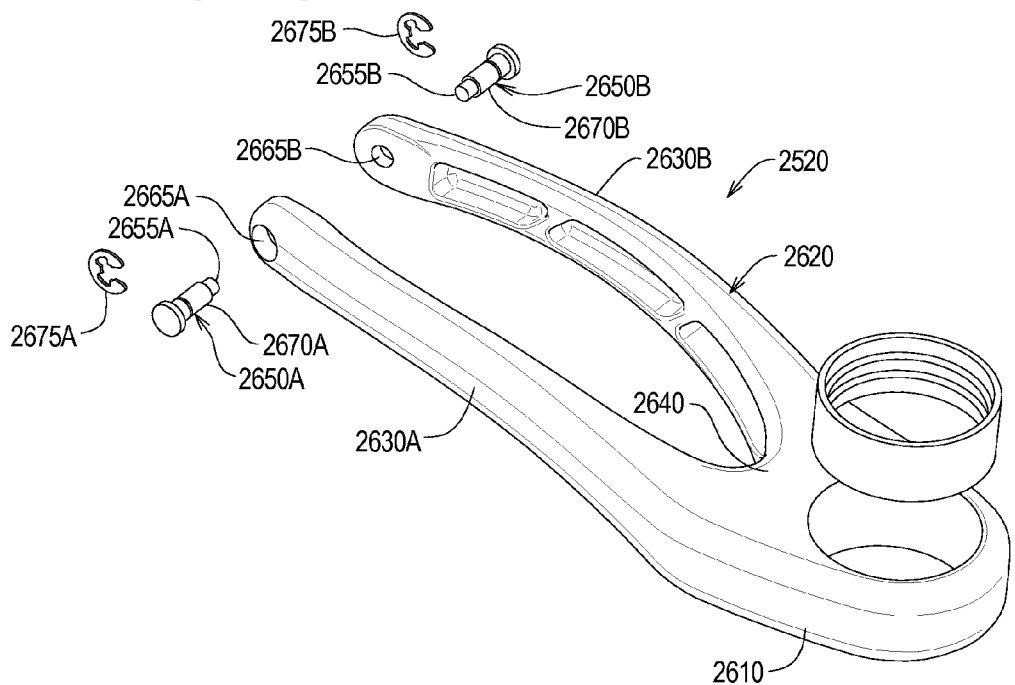
FIG. 26 is an exploded perspective view of the chalk holding device of FIG. 25.

FIG. 26 is an exploded perspective view of the chalk holding device 2520 of FIG. 25. The embodiment shown in FIGS. 24-26 is similar to the embodiment shown to the embodiment shown in FIGS. 1A, 3 and 4. However, it includes a different mechanism for attaching the chalk holding device 2510 to the wheeled device (e.g., scooter). In addition, there is no mechanism to adjust the chalk receiving member relative to the arm assembly (although one could be provided).

With reference to FIG. 26, chalk holding device 2520 includes a chalk receiving member 2610 that is integral with an arm assembly 2620, which includes a first arm 2630A and a second arm 2630B that may be integrally connected by way of a transition region 2640. First and second pintles 2650A, 2650B are provided to form a connection to a wheel of a scooter (e.g., second wheel 2530B).

More specifically, many popular scooters include Allen socket head screws or socket head bolts (not shown) that are used to connect their wheels. First end 2655A of first pintle 2650A is sized to be received in the socket head of such a wheel socket head screw. Similarly, first end 2655B of second pintle 2650B is sized to be received in the socket head of a corresponding wheel socket head screw.

First pintle 2650A includes a first head 2660A at an end opposite to its first end 2655A and second pintle 2650B includes a second head 2660B at an end opposite to its first end 2655B. The first pintle 2650A is sized to be received by a first aperture 2665A in first arm 2630A and second pintle 2650B is sized to be received by a second aperture 2665B in second arm 2630B. The first head 2660A is sized to retain the first pintle 2650A partially within the first aperture 2665A and the second head 2660B is sized to retain the second pintle 2650B partially within the second aperture 2665B (e.g., so that the first and second pintles 2650A, 2650B respectively do not go all the way through first and second apertures 2665A, 2665B when they are inserted therein).

Figure 27:
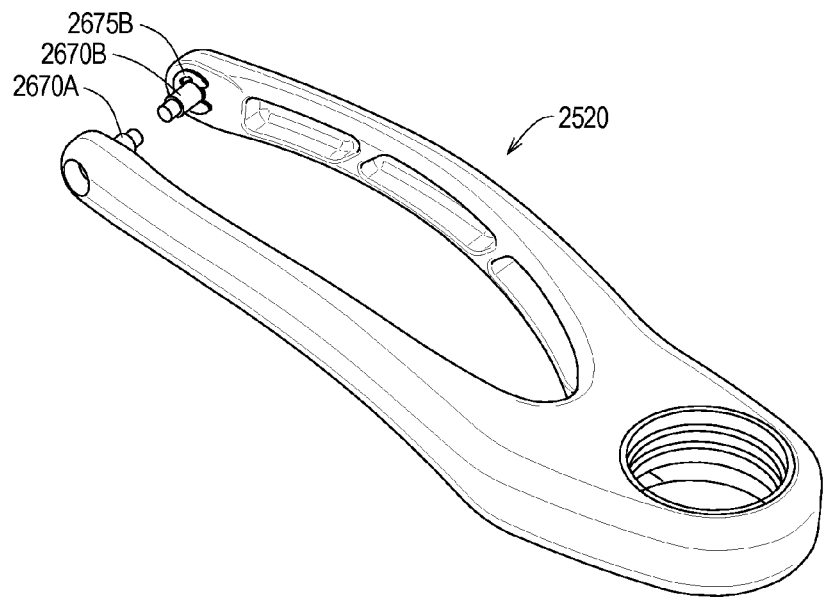
FIG. 27 is a perspective view of the chalk holding device of FIG. 25.

The first pintle 2650A includes a first shoulder 2670A that cooperates with a first external retaining ring 2675A to prevent the first pintle 2650A from being removed from the first aperture 2665A once it has been inserted therein. Similarly, second pintle 2650B includes a second shoulder 2670B that cooperates with a second external retaining ring 2675B to prevent the second pintle 2650B from being removed from the second aperture 2665B once it has been inserted therein. This is best shown in connection with FIG. 27, which is a perspective view of the chalk holding device of FIG. 25.

The first and second shoulders 2670A, 2670B may, at the ends opposite their corresponding first and second external retaining rings 2675A, 2675B, respectively limit the amount of insertion of the first and second ends 2655A, 2655B of the first and second pintles 2650A, 2650B into the socket heads of respective wheel socket head screws.

In one embodiment, the first and second ends 2655A, 2655B of the first and second pintles 2650A, 2650B have a circular cross-section. In another embodiment, they have a polygonal cross-section. In one embodiment, the polygonal cross-section is square. In one embodiment, the polygonal cross-section is hexagonal.

The chalk holding device 2520 is attached to the scooter 2510 in a manner similar to which the chalk holding device 20 is attached to a bicycle. In particular, the first and second arms 2630A, 2630B are flexed apart. Then, the first and second ends 2655A, 2655B of first and second pintles 2650A, 2650B are aligned with corresponding wheel socket head screws. The first and second arms 2630A, 2630B are slowly released and, due to the resilience and/or memory of the materials used to make the chalk holding device 2520, the first and second ends 2655A, 2655B of the first and second pintles 2650A, 2650B are inserted into their corresponding wheel socket head screws to form a connection.

One or more embodiments of the chalk holding device may also be attached to a skateboard. Of course, the chalk holding device would be sized accordingly.

In one embodiment, the device includes an accessory that permits multiple pieces of chalk to be used. This accessory could cooperate with aperture 465 or multiple apertures could be provided.

Figure 28:
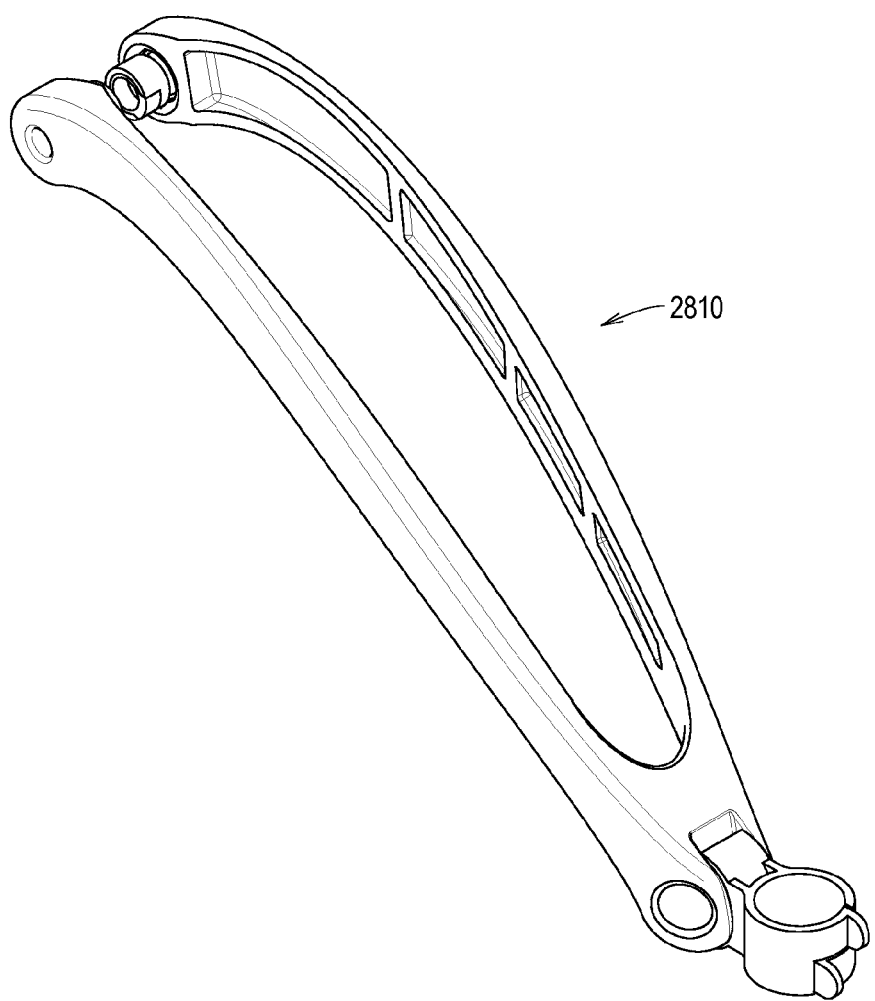
FIG. 28 is a perspective view of yet another exemplary embodiment of the chalk holding device of the present invention.
Figure 29:
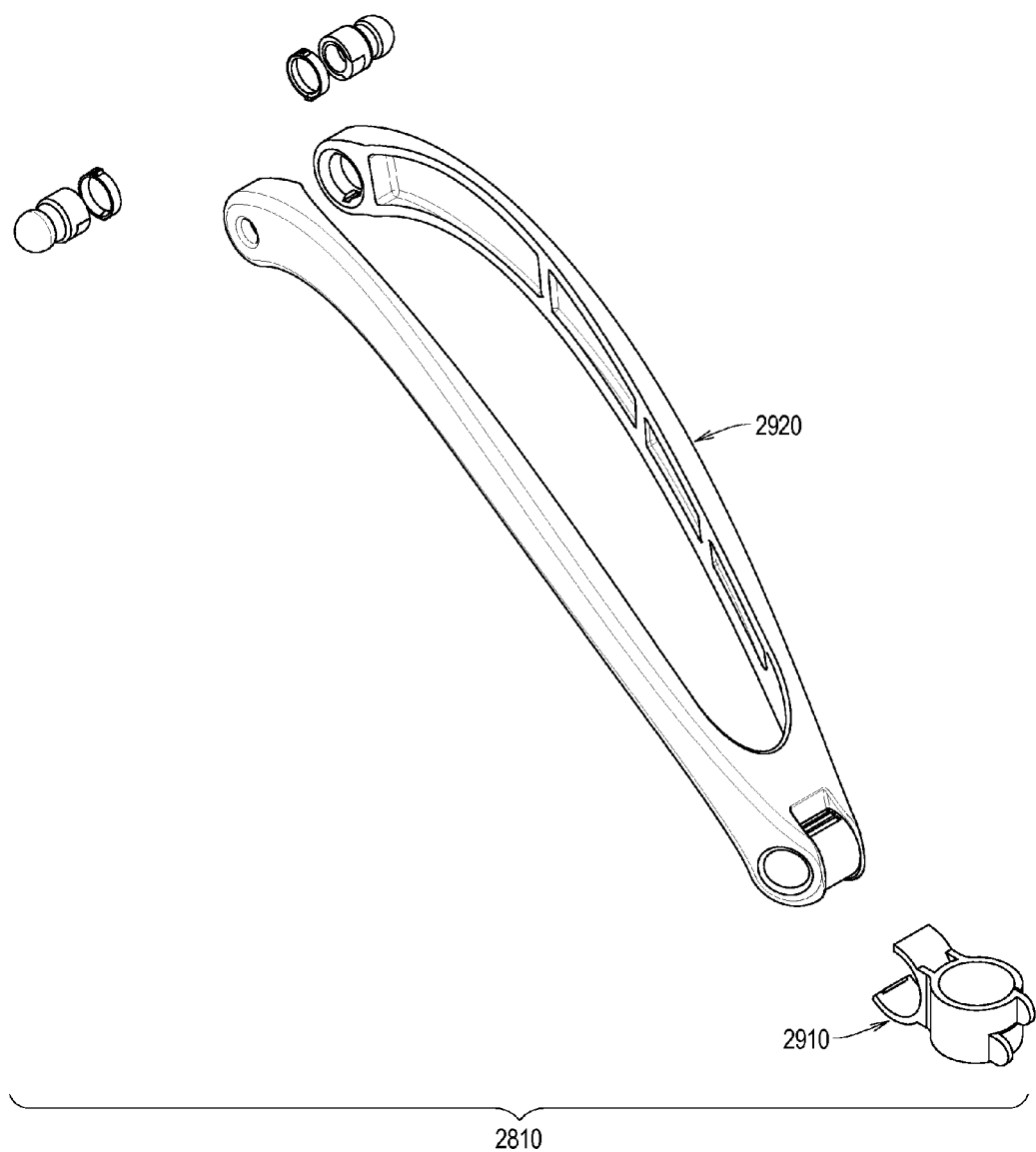
FIG. 29 is an exploded perspective view of the chalk holding device of FIG. 28.
Figure 30:
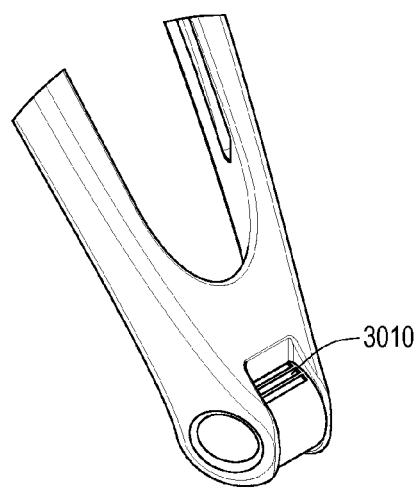
FIG. 30 is a top perspective view of a portion of the arm assembly.
Figure 31:
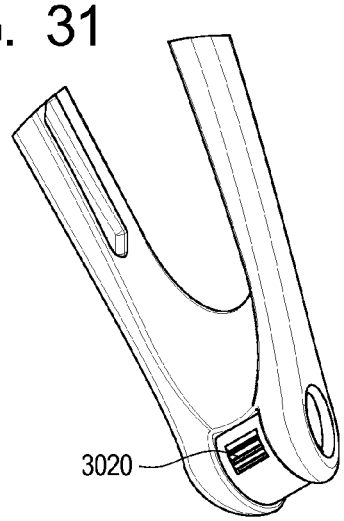
FIG. 31 is a bottom perspective view of a portion of the arm assembly.
Figure 32:
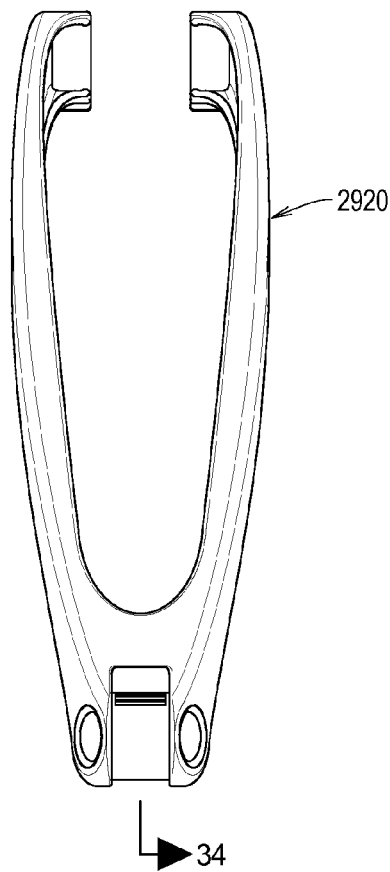
FIG. 32 is a top view of the arm assembly.
Figure 33:
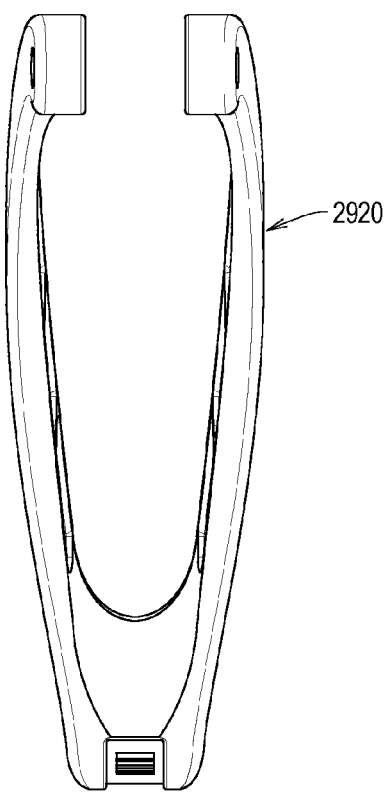
FIG. 33 is a bottom view of the arm assembly.

FIG. 28 is a perspective view of yet another exemplary embodiment of the chalk holding device 2810 of the present invention. As shown in FIG. 29, which is an exploded perspective view of the chalk holding device of FIG. 28, the chalk holding device 2810 includes, among other things, a chalk receiving member 2910 and an arm assembly 2920.

The chalk holding device 2810 is similar to the chalk holding device 20 of FIGS. 1 and 22. However, the manner in which chalk receiving member 2910 and arm assembly 2920 are attached to one another differs from the manner in which their corresponding components are attached to one another.

FIGS. 30-35 illustrate that arm assembly 2920, which includes a first set of attachment grooves 3010 and a second set of attachment grooves 3020, which cooperate with the chalk receiving member 2910 to allow the chalk receiving member 2910 and the arm assembly 2920 to be attached to one another.

As best shown in FIG. 35, in one embodiment, the first set of attachment grooves 3010 have a rounded cross-section. In one embodiment, the second set of attachment grooves 3020 each have a cross-section with one sharp edge 3510 and one chamfered edge 3520. As will be understood after reviewing FIGS. 36-42 and the description associated therewith, the cross-sectional shapes of the first set of attachment grooves 3010 and the second set of attachment grooves 3020 permits adjustment of the angle of the chalk receiving member 2910 relative to the arm assembly 2920 and, hence, adjustment of the chalk trailing angle.

In addition, the cross-sectional shape of the second set of attachment grooves 3020 tends to resist movement of the chalk receiving member 2910 in a counterclockwise direction (with reference to FIG. 35) relative to the arm assembly 2920. This may be particularly useful when the chalk holding device 2810 is in operation, since the dragging of chalk on a surface will create forces in a counterclockwise direction with reference to FIG. 35.

While FIG. 35 illustrates five grooves in the first set of attachment grooves and three grooves in the second set of attachment grooves, it should be understood that more or less grooves are possible and anticipated. Furthermore, it should be understood that the cross-sectional shapes of the grooves may differ, for example, so as to allow adjustment of the angle of the chalk receiving member 2910 relative to the arm assembly 2920 in a different direction or to reduce and/or prevent movement in one or more directions (e.g., when there is only one groove that forms the first set of attachment grooves and there is only one groove that forms the second set of attachment grooves).

FIGS. 36-39 illustrate a chalk receiving member 2910, which includes first and second nubs 3610, 3620, an aperture 3630, set of protuberances 3710, a first set of attachment projections 3910 and a second set of attachment projections 3920. The chalk receiving member 2910 attaches to the arm assembly 2920 and is used to hold chalk (not shown).

In one embodiment, the first set of attachment projections 3910 have a rounded cross-section (see FIG. 39) and correspond with the first set of attachment grooves 3010. Similarly, in one embodiment, the second set of attachment projections 3920 (in this case the set is just one projection) have a rectangular cross-section and correspond with the second set of attachment grooves 3020.

First and second nubs 3610, 3620 are used to increase the diameter of the aperture 3630 when inserting a piece of chalk therein. Specifically, a user may squeeze the first and second nubs 3610, 3620 towards one another by pinching the nubs 3610, 3620 between the user's thumb and forefinger, so as to increase the diameter of the aperture.

The inventors have observed significant variations in chalk diameters. The present design accommodates such variations. For example, the diameter of the aperture (when no force is applied by a user to the nubs) may be sized to be slightly less than the smallest measured diameter of a particular size of chalk (e.g., sidewalk chalk). Because there may be variations amongst brands of chalk, having an adjustable aperture may also accommodate chalk of differing brands.

The first set of protuberances 3710 are designed to engage the chalk when it is inserted into aperture 3630. In one embodiment, each of the first set of protuberances 3710 is angled (see FIG. 37), so as to reduce the likelihood of the chalk slipping out of aperture 3630. Specifically, the first set of protuberances effectively reduces the diameter of the aperture 3630 at one of its ends.

Figure 40:
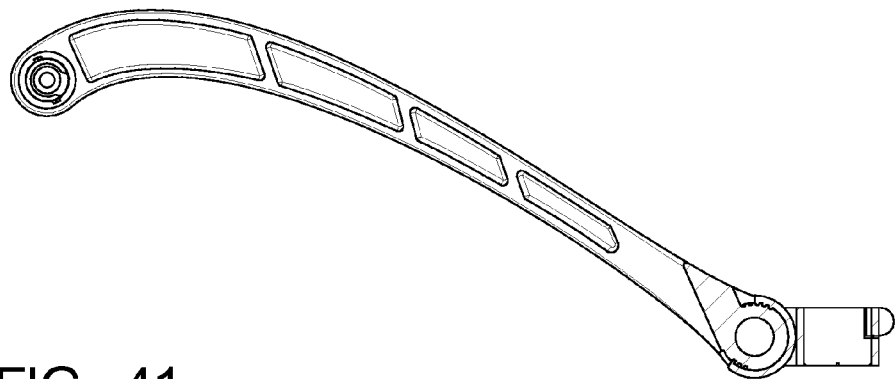
FIG. 40 is a cross-sectional view similar to FIG. 34, with the chalk receiving member attached to the arm assembly in a first position.
Figure 41:
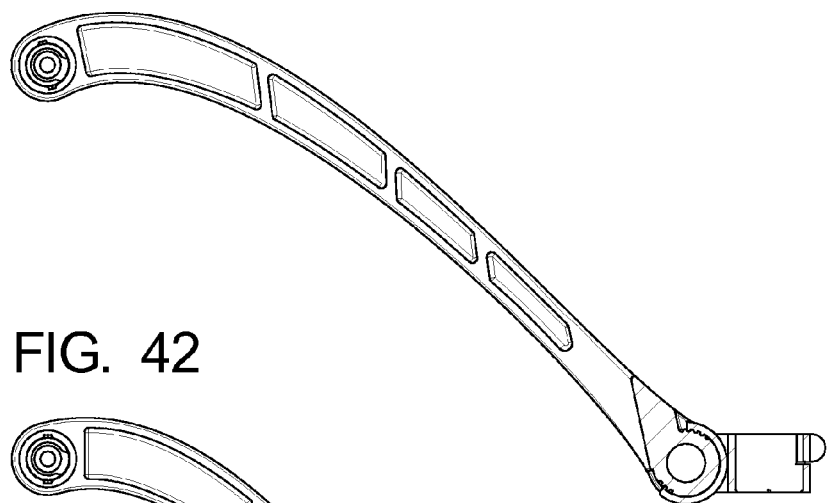
FIG. 41 is a view similar to FIG. 40, with the chalk receiving member attached to the arm assembly in a second position.
Figure 42:
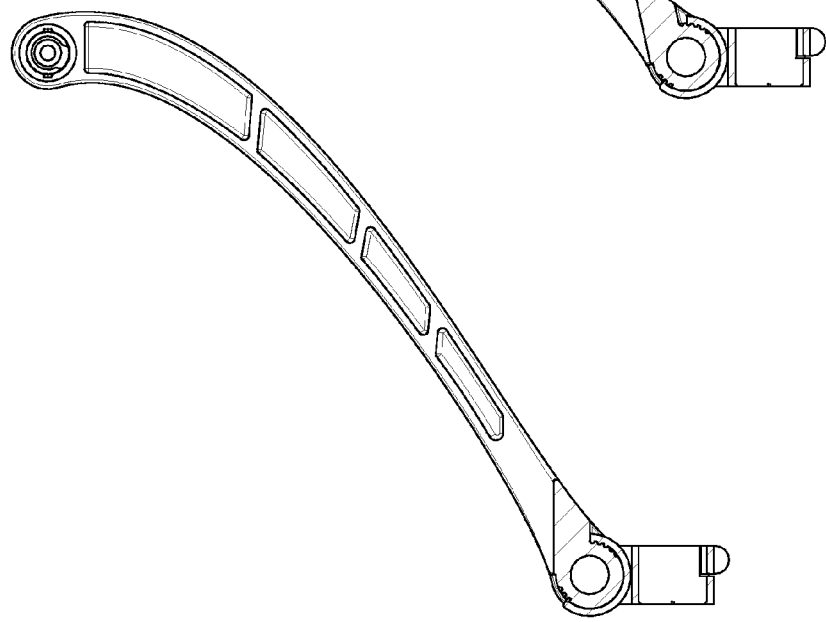
FIG. 42 is a view similar to FIG. 40, with the chalk receiving member attached to the arm assembly in a third position.

FIGS. 40-42 are cross-sectional views which illustrate the chalk receiving member 2910 attached to the arm assembly 2920 in a first, second and third trailing angle positions, respectively.

Although not shown in the above drawings, the chalk holding device 2810 may include a thickened area on the underside of the arm assembly 2920, so as to prevent wear when it is being dragged on a riding surface without chalk therein. In one embodiment, small pieces of metal (e.g., dots of metal) or a metal plate may be heat staked to the underside of the arm assembly 2920, so as to prevent wear. In one embodiment, the chalk holding device 2810 is made entirely of plastic.

Figure 43:
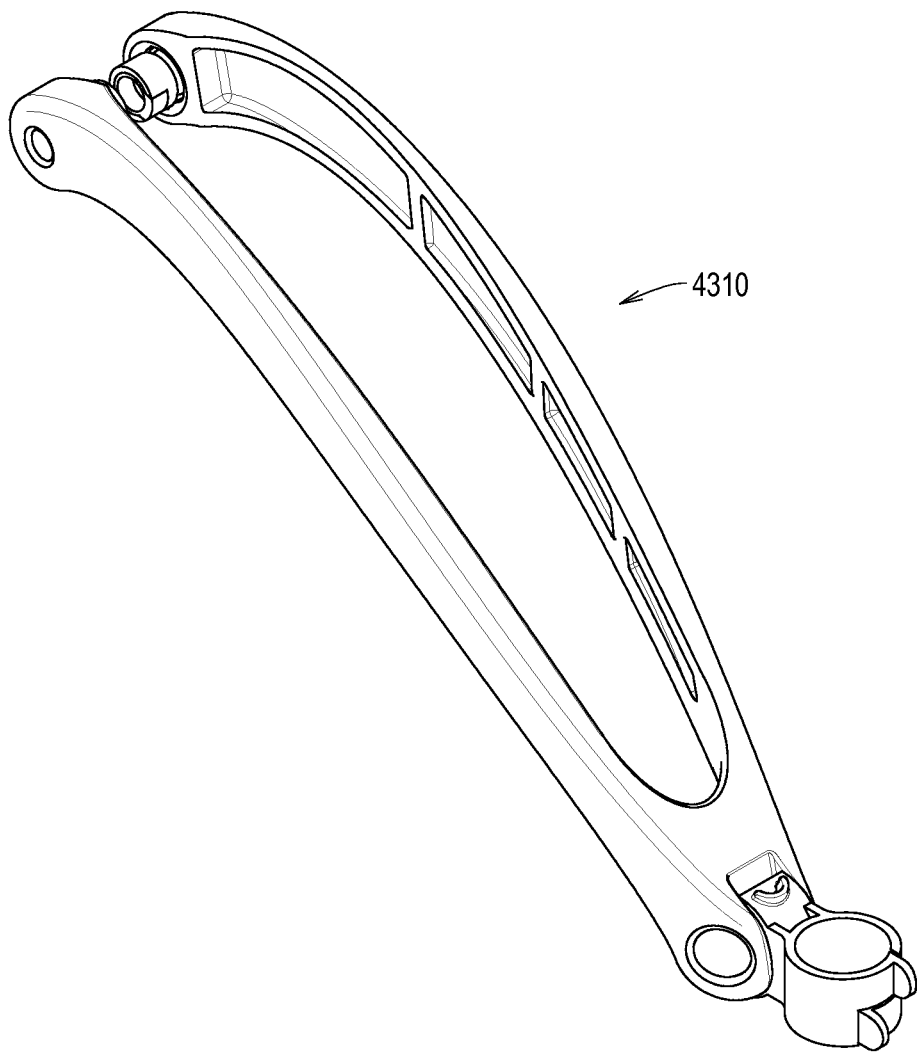
FIG. 43 is a perspective view of yet a further exemplary embodiment of the chalk holding device of the present invention.
Figure 44:
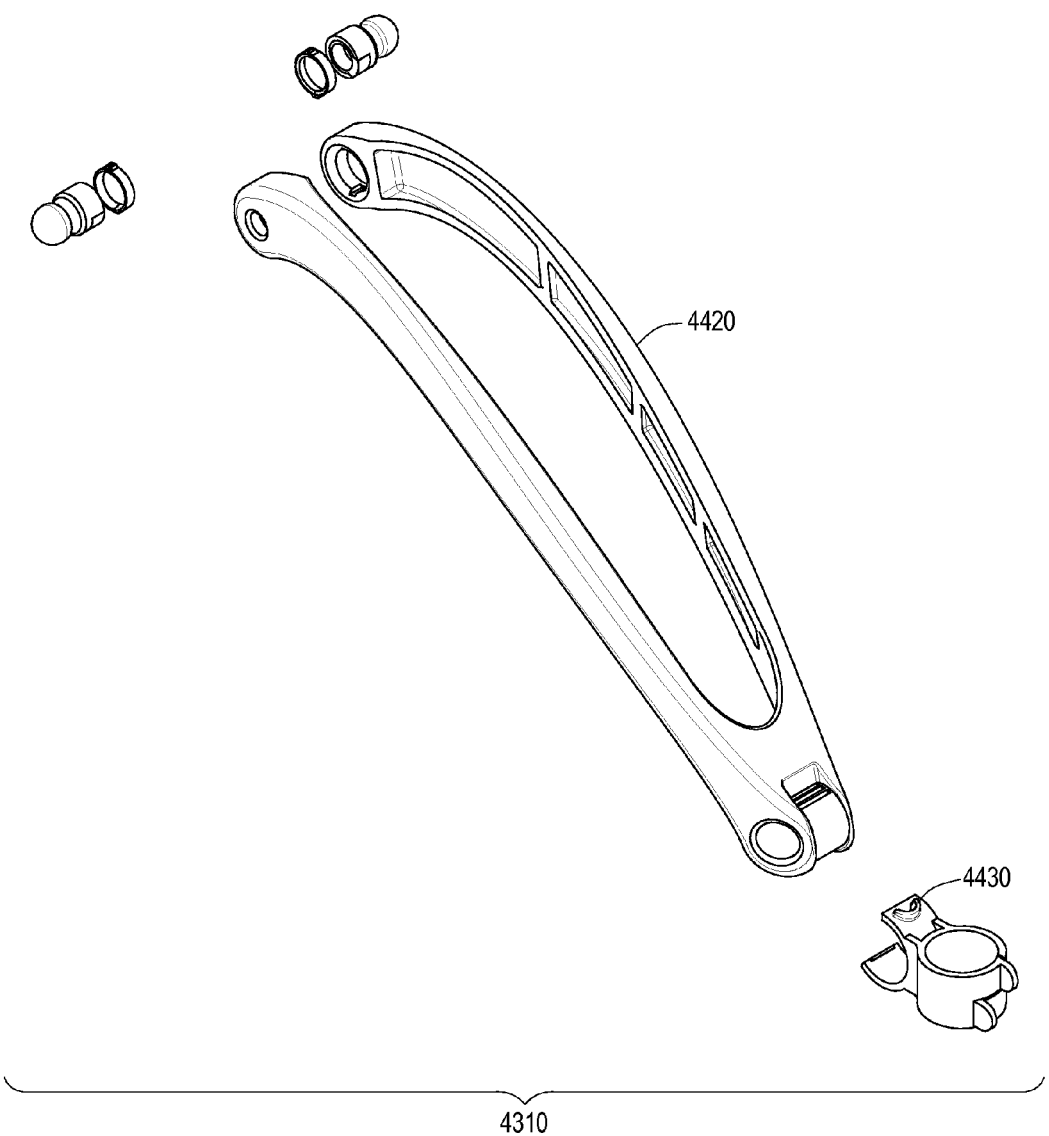
FIG. 44 is an exploded perspective view of the chalk holding device of FIG. 43.
Figure 45:
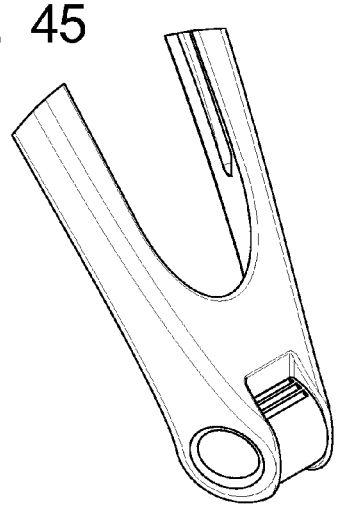
FIG. 45 is a top perspective view of a portion of the arm assembly.
Figure 46:
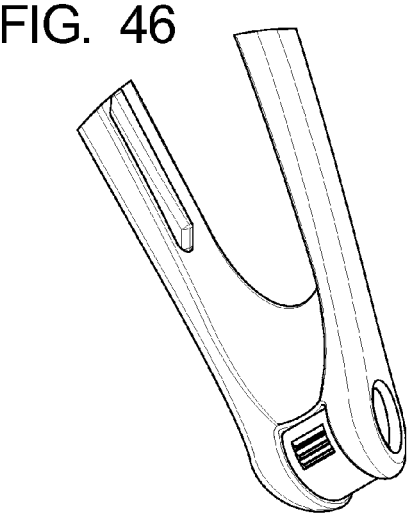
FIG. 46 is a bottom perspective view of a portion of the arm assembly.
Figure 47:
FIG. 47 is a top view of the arm assembly.
Figure 48:
FIG. 48 is a bottom view of the arm assembly.
Figure 49:
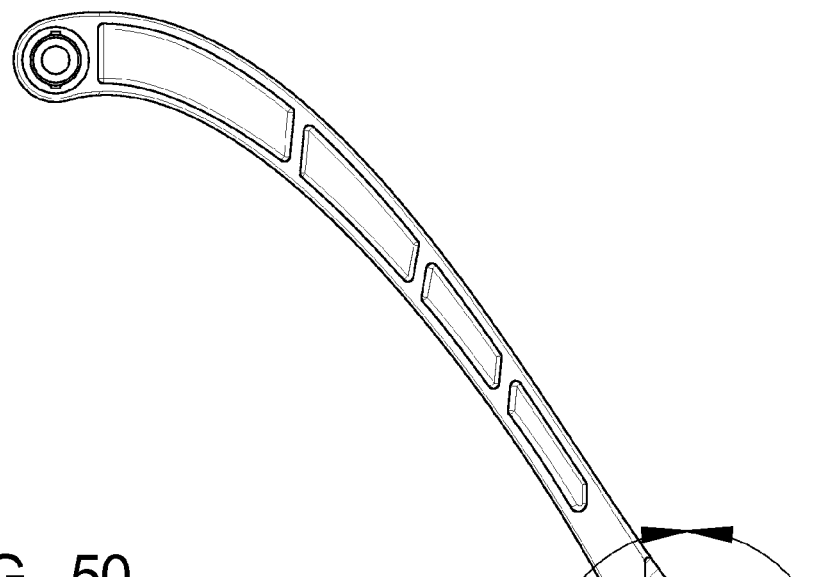
FIG. 49 is a cross-sectional view taken along line 49-49 of FIG. 47.
Figure 50:
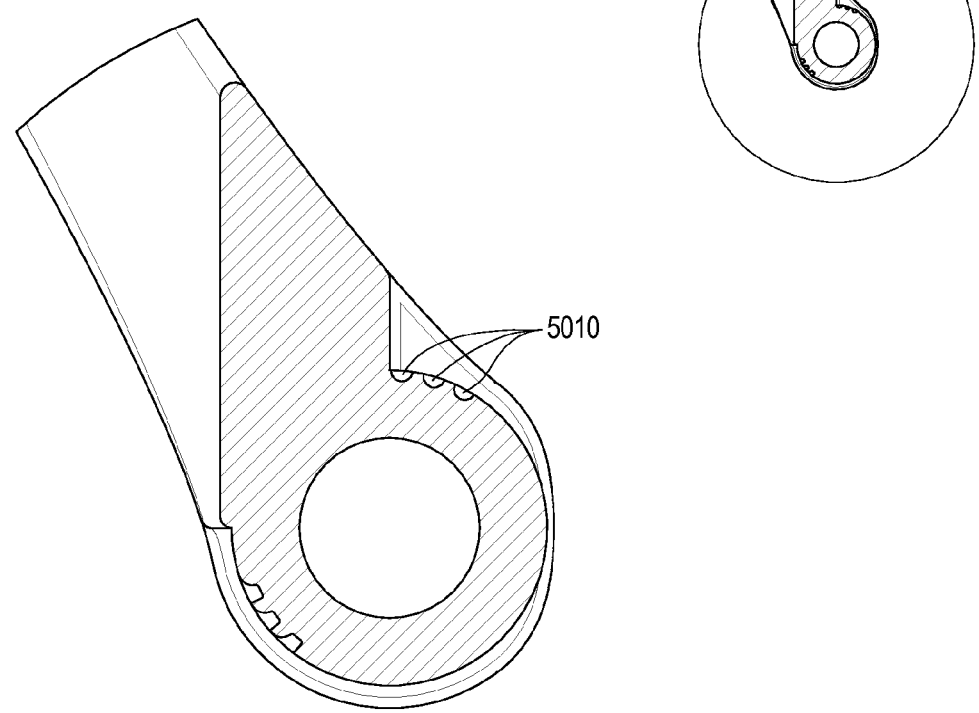
FIG. 50 is a magnified view of the encircled portion of FIG. 49.
Figure 55:
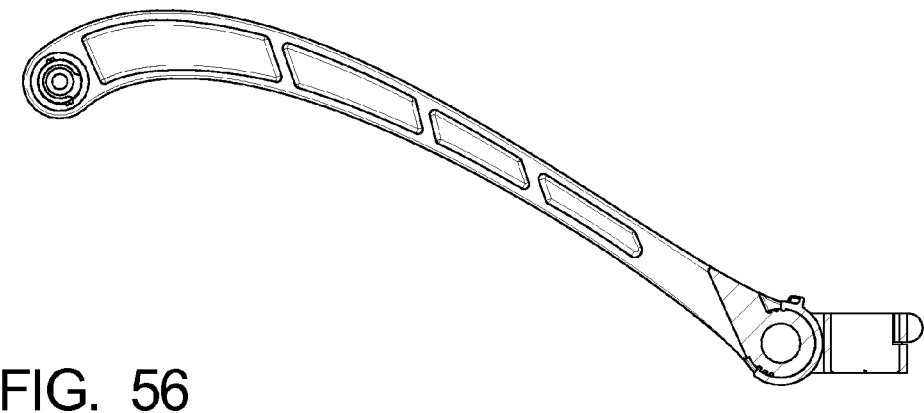
FIG. 55 is a cross-sectional view similar to FIG. 49, with the chalk receiving member attached to the arm assembly in a first position.
Figure 56:
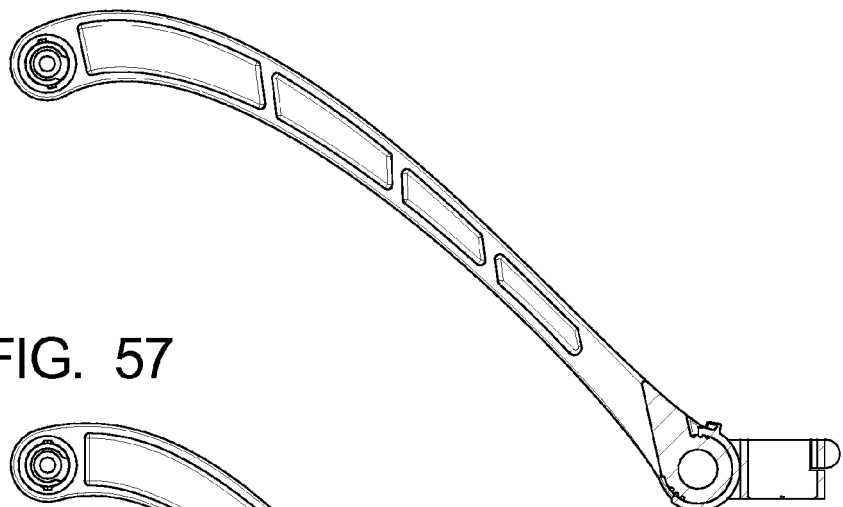
FIG. 56 is a view similar to FIG. 55, with the chalk receiving member attached to the arm assembly in a second position.
Figure 57:
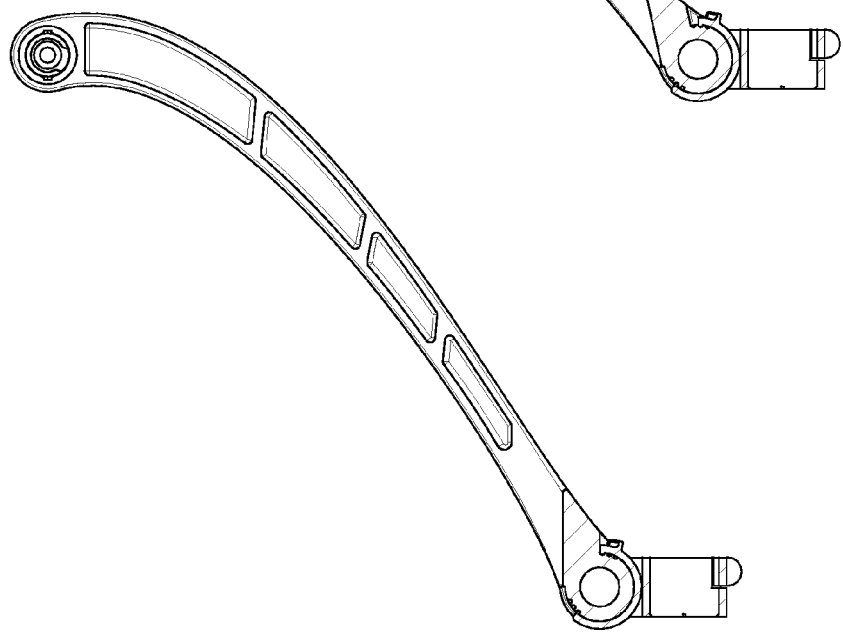
FIG. 57 is a view similar to FIG. 55, with the chalk receiving member attached to the arm assembly in a third position.

FIG. 43 is a perspective view of yet a further exemplary embodiment of the chalk holding device 4310 of the present invention. The chalk holding device 4310 includes a chalk receiving member 4410 and an arm assembly 4420.

FIGS. 43-57 correspond with FIGS. 28-42 and the embodiment of FIGS. 43-57 is similar to that of FIGS. 28-42. Accordingly, only certain features of the embodiment of FIGS. 43-57 are discussed below.

The chalk holding device 4310 includes a thumb tab 4430, which permits the angle of the chalk receiving member 4410 and the arm assembly 4420 to be adjusted more easily (as compared to the chalk holding device 2810), since a user has a more suitable bearing surface for applying force. The thumb tab 4430 may also permit the chalk receiving member 4410 and the arm assembly 4420 to be detached from one another more easily.

The embodiment of FIGS. 43-57 also differs from the embodiment of FIGS. 28-42 in that there are only three grooves in the first set of attachment grooves 5010 and only one projection in the first set of attachment projections 5410.

FIGS. 58-76 illustrate another exemplary embodiment of the chalk holding device 5810 of the present invention. While not identical to the embodiment of the chalk holding device shown in FIGS. 22-24, the embodiment shown in FIGS. 58-76 has some similarities thereto. As with the other embodiments, one or more of the features shown in one embodiment of the invention may replace corresponding features in other embodiments.

As best shown in FIGS. 59-60, one difference from the embodiment shown in FIGS. 22-24 is that one or more magnets 5910A, 5910B are provided, so as to supplement (or provide) a connection to a wheeled device (e.g., a bicycle). Wheel axles and axle nuts are generally made of metal to which the magnets may be attracted.

Because wheel axle lengths can vary in size, the first and second magnets 5910A, 5910B are designed to move within respective first and second recesses 6010A, 6010B in first and second balls 6020A, 6020B. Each of the magnets includes a shoulder portion 6030A, 6030B and a neck portion 6040A, 6040B. One or more retaining tabs 6050A, 6050B cooperate with the shoulder portion 6030A of the first magnet 5910A to keep a portion of the first magnet 5910 within the first recess 6010A. Corresponding retaining tabs 6050C, 6050D (not numbered) cooperate with the second magnet 5910B.

It should be understood that, in one embodiment, more than two retaining tabs 6050A, 6050B may be provided. In another embodiment, an integral retaining ring, instead of retaining tabs, is provided.

The retaining tabs 6050A, 6050B are designed such that the shoulder portion 6030A of the first magnet 5910A may be pushed into the recess 6010A during assembly. However, once assembled, it is difficult to completely remove the first magnet 5910A therefrom.

Figure 61:
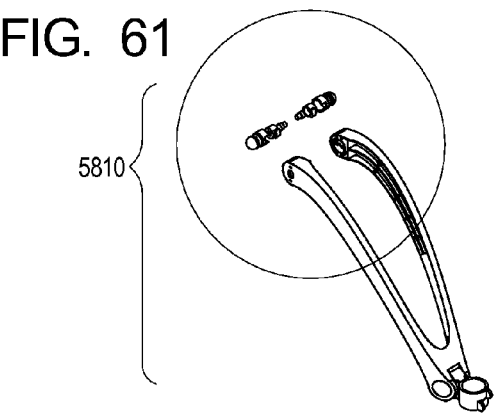
FIG. 61 is a partially-exploded perspective view of the chalk holding device of FIG. 58.
Figure 62:
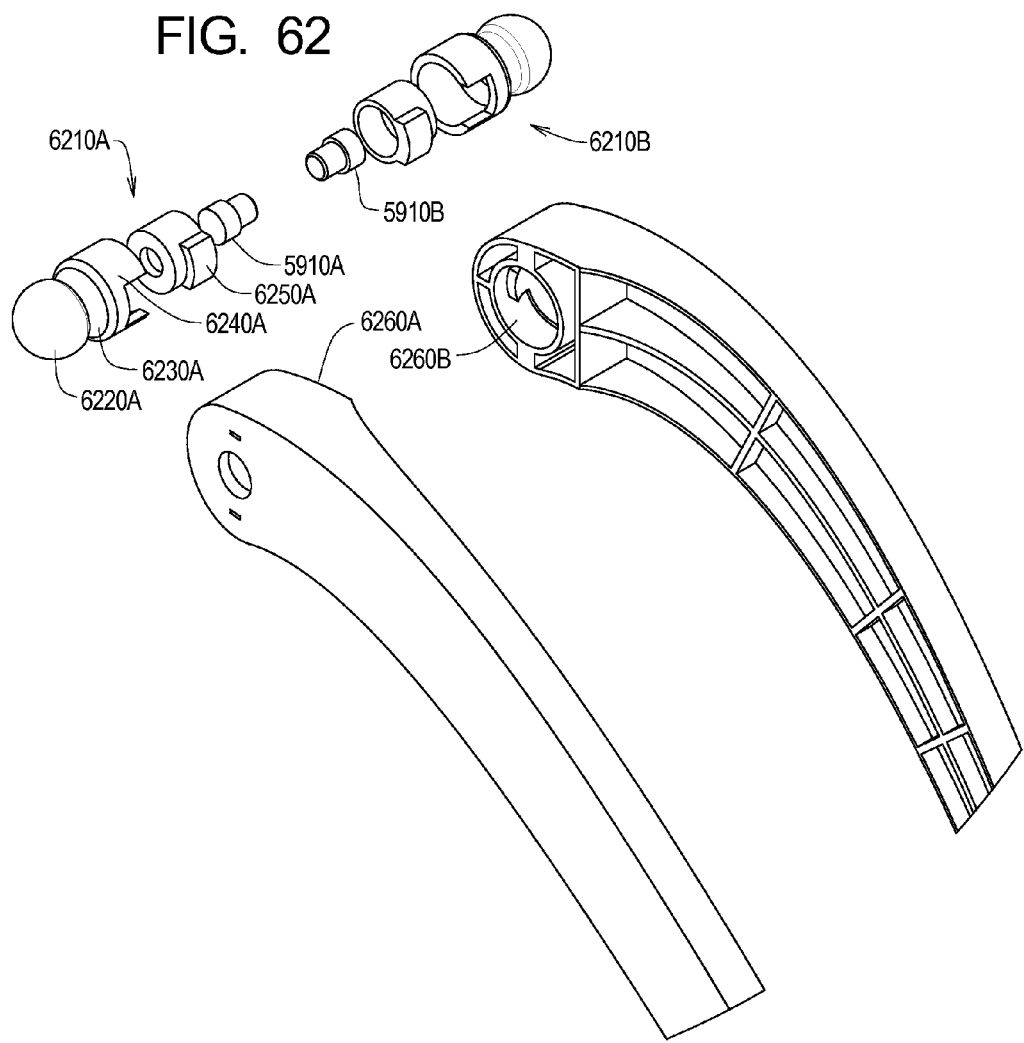
FIG. 62 is a magnified view of the encircled portion of FIG. 61.

Another difference between the chalk holding device 5810 and the embodiment shown in FIGS. 22-24 is the manner in which the ball-and-socket connection is made. With reference to FIGS. 61 and 62, first and second axle cup assemblies 6210A, 6210B are shown. The first axle cup assembly 6210A includes first ball 6220A, first intermediate region 6230A and first main axle cup 6240A. Also shown are first axle cup insert 6250A and magnet 5910A.

Figure 75:
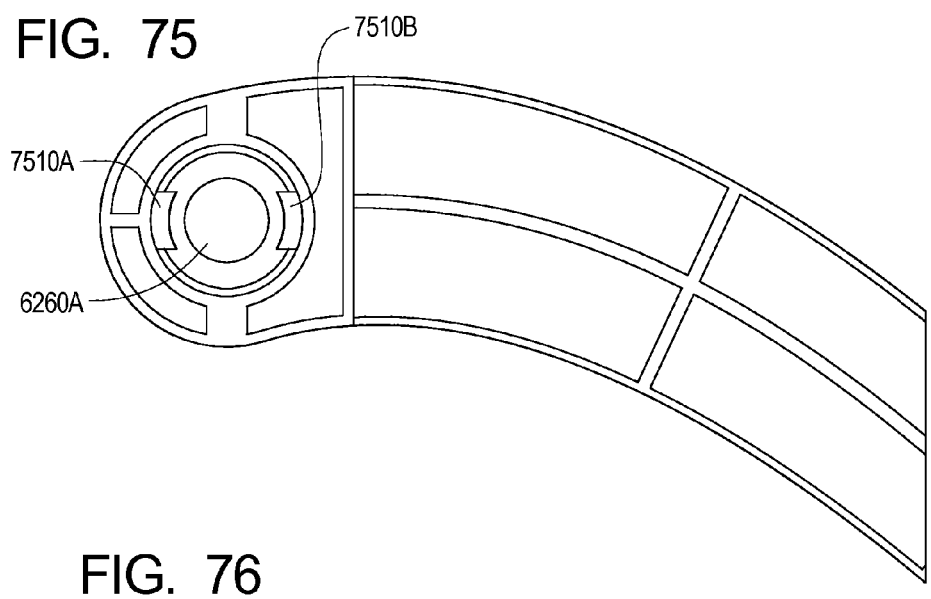
FIG. 75 is a sectional view taken along line 75-75 of FIG. 74.

When assembled, a ball-and-socket connection is made between the ball 6210A and the socket 6260A. Instead of using a first retaining ring having first and second portions to establish a ball-and-socket connection, as shown in FIG. 75, first and second keepers 7510A, 7510B are used to maintain a connection between the ball 6210A and the socket 6260A.

Specifically, during assembly, the ball 6210A is press fit into the socket 6260A. The keepers 7510A, 7510B engage the ball 6210A and prevent the ball 6210A from being easily removed from the socket 6260A.

It should be understood that more than two keepers may be provided. Furthermore, the exact shape and size may vary from that shown in the figures.

Figure 63:
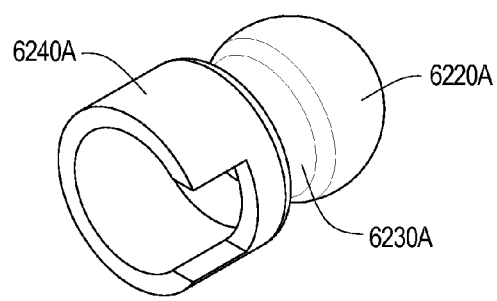
FIG. 63 is a perspective view of an axle cup assembly of the chalk holding device of FIG. 58.
Figure 66:
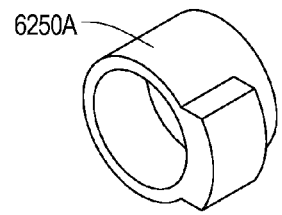
FIG. 66 is a perspective view of an axle cup insert of the chalk holding device of FIG. 58.
Figure 64:
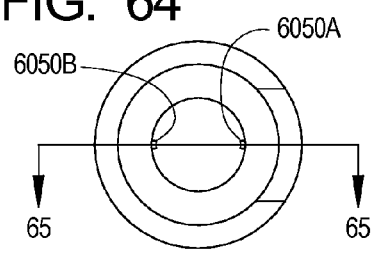
FIG. 64 is a bottom view of the axle cup assembly of FIG. 63.
Figure 67:
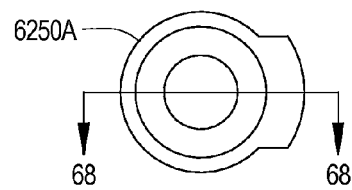
FIG. 67 is an end view of the axle cup insert of FIG. 66.
Figure 65:
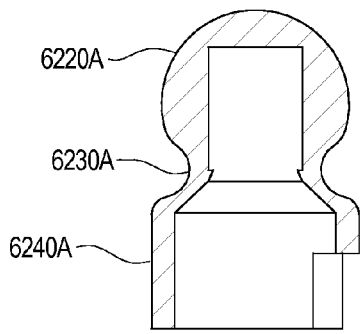
FIG. 65 is a sectional view taken along line 65-65 of FIG. 64.
Figure 68:
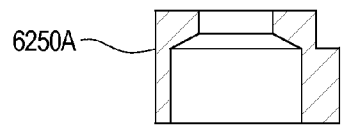
FIG. 68 is sectional view taken along line 68-68 of FIG. 67.
Figure 69:
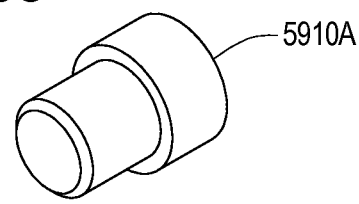
FIG. 69 is a perspective view of a magnet of the chalk holding device of FIG. 58.
Figure 70:
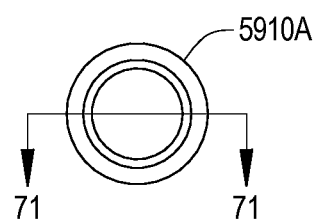
FIG. 70 is an end view of the magnet of FIG. 69.
Figure 71:
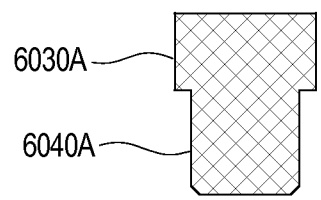
FIG. 71 is a sectional view taken along line 71-71 of FIG. 70.

FIGS. 63-65 are various views of the first axle cup assembly 6210A of the chalk holding device of FIG. 58. FIGS. 66-68 are various views of the first axle cup insert 6250A of the chalk holding device of FIG. 58, which may be substantially the same as the first axle cup insert 2390A shown in FIG. 23. FIGS. 69-71 are various views of the first magnet 5910A of the chalk holding device of FIG. 58.

In one embodiment, the magnet is a neodymium rare earth magnet. Such magnets are known to be very strong. In one embodiment, more than one magnet per axle is provided. In one embodiment, one or more magnets are embedded in and/or located near the ball of an axle cup assembly. In one embodiment, one or more magnets are embedded in and/or located near the intermediate region of an axle cup assembly. In one embodiment, one or more magnets are embedded in and/or located near the main axle cup of an axle cup assembly. In one embodiment, one or more magnets are embedded and/or located in an axle cup insert. In one embodiment, the magnet is a ring magnet.

Figure 72:
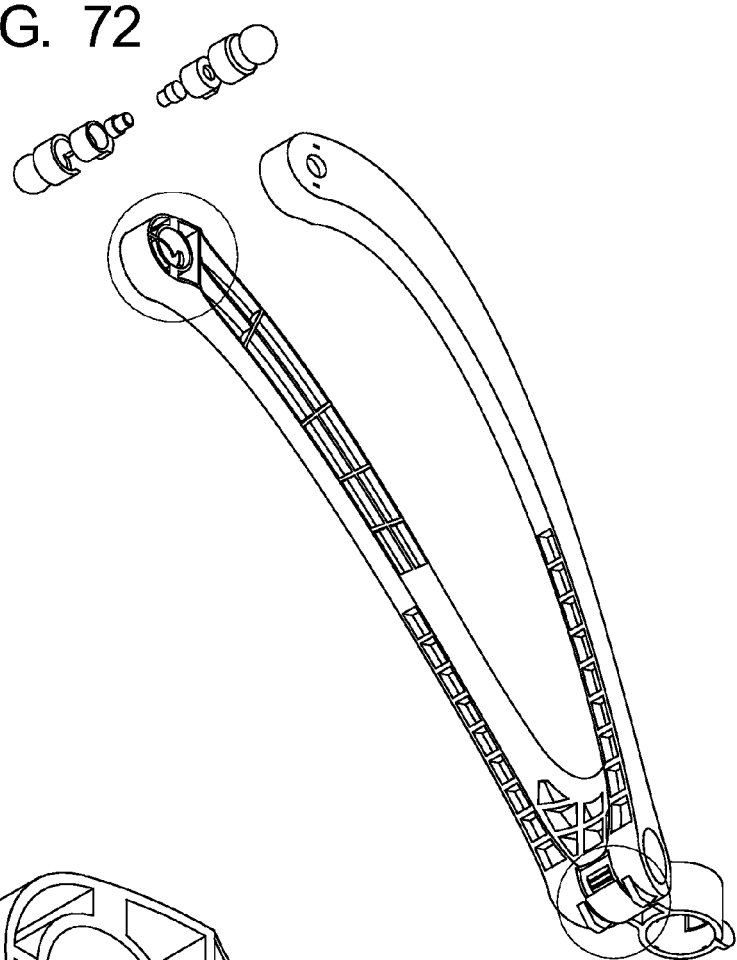
FIG. 72 is a partially-exploded, bottom perspective view of the chalk holding device of FIG. 58.
Figure 73:
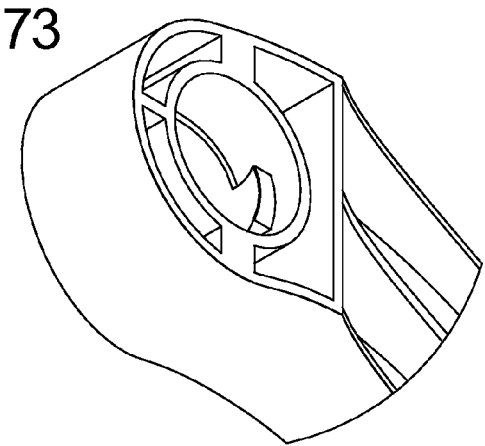
FIG. 73 is a magnified view of one of the encircled portions of FIG. 72.
Figure 74:
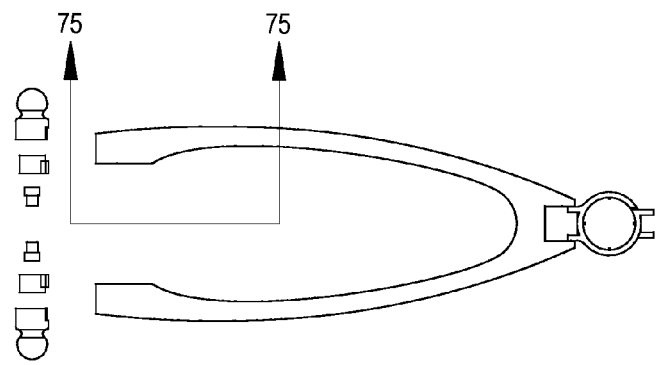
FIG. 74 is a partially-exploded, top view of the chalk holding device of FIG. 58.
Figure 76:
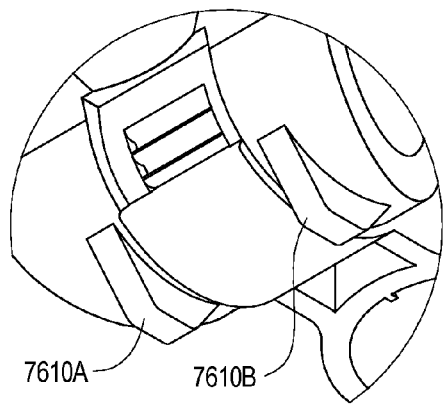
FIG. 76 is a magnified view of one of the encircled portions of FIG. 72.
Figure 77:
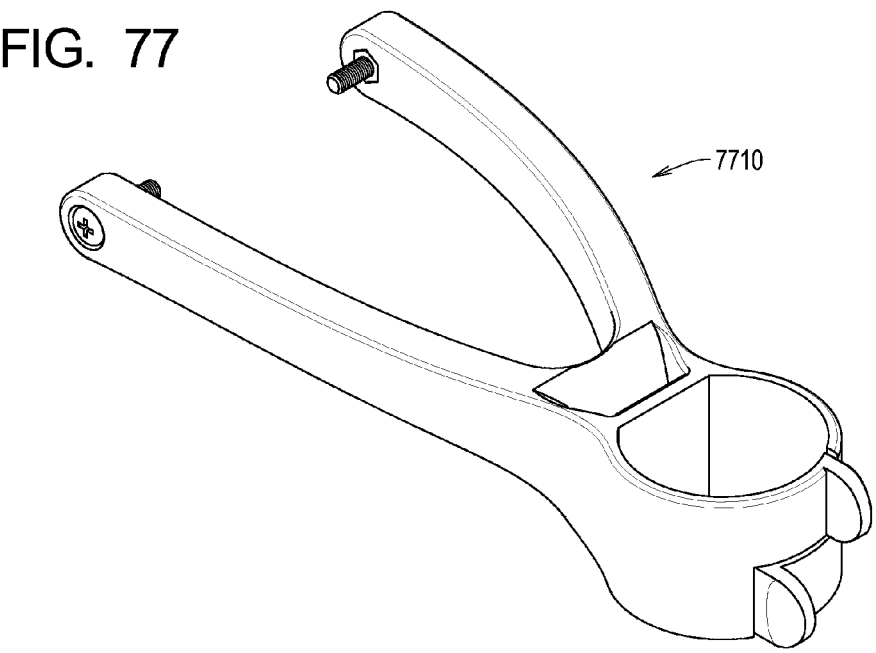
FIG. 77 is perspective view of yet another exemplary embodiment of a chalk holding device of the present invention.
Figure 78:
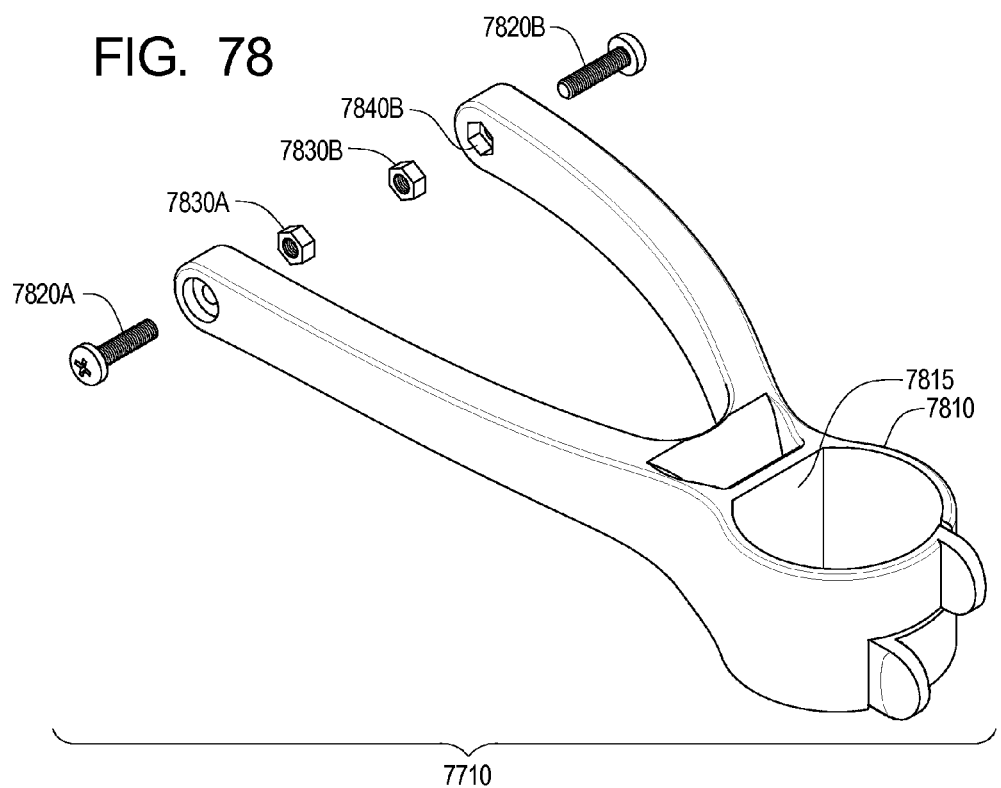
FIG. 78 is an exploded perspective view of the chalk holding device of FIG. 77.
Figure 79:
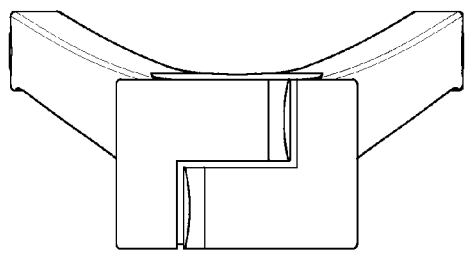
FIG. 79 is front view of a portion of the chalk holding device of FIG. 77.
Figure 80:
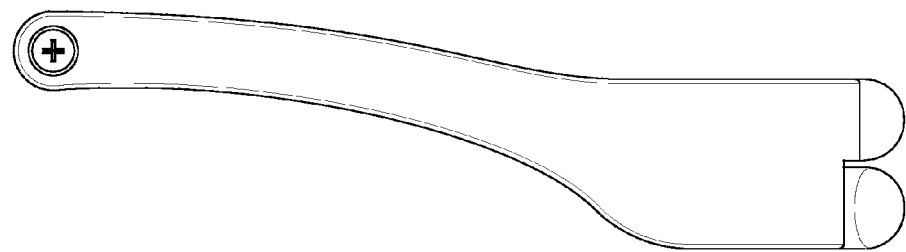
FIG. 80 is a first side view of the chalk holding device of FIG. 77.
Figure 81:
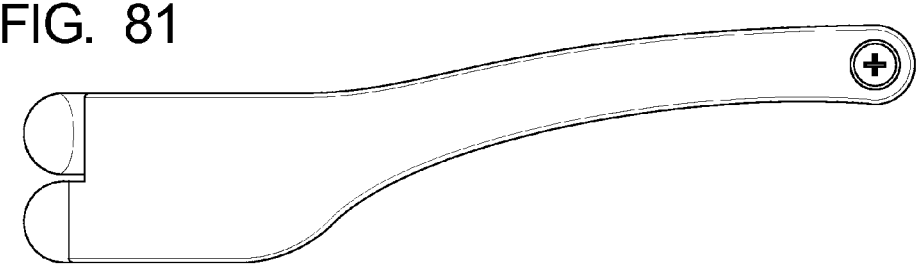
FIG. 81 is a second view of the chalk holding device of FIG. 77.
Figure 82:
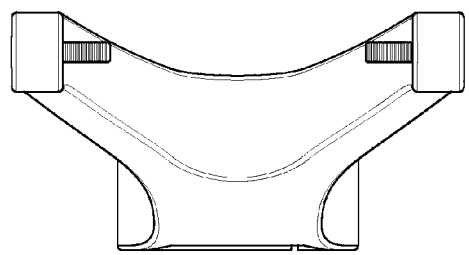
FIG. 82 is a back view of the chalk holding device of FIG. 77.
Figure 83:
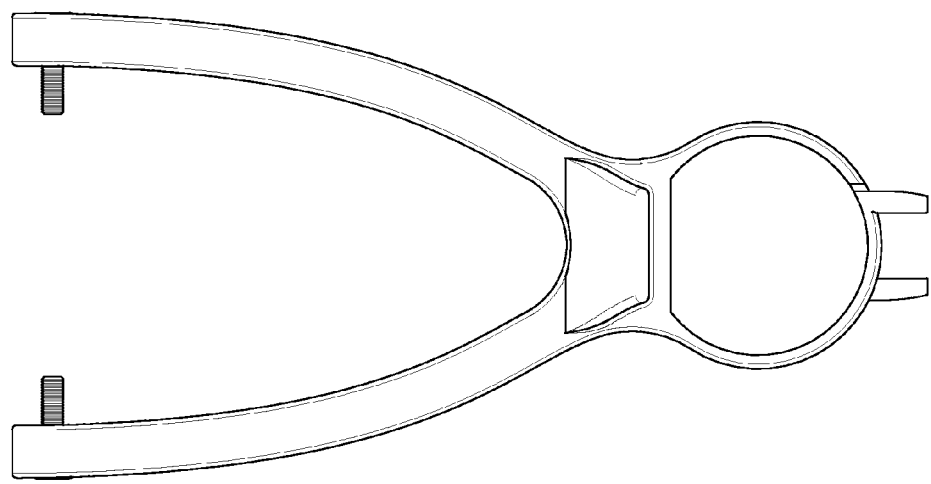
FIG. 83 is a top view of the chalk holding device of FIG. 77.
Figure 84:
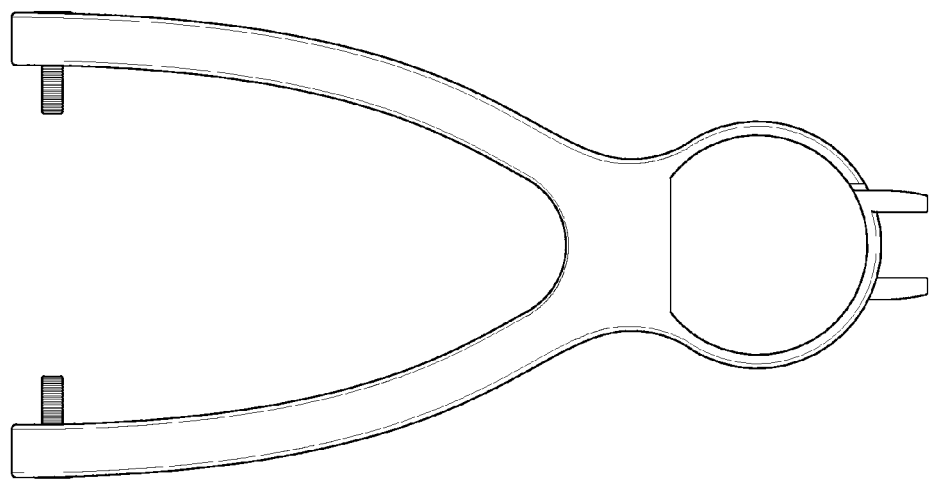
FIG. 84 is a bottom view of the chalk holding device of FIG. 77.

Reference is now made to FIGS. 72 and 76, where FIG. 72 is a partially-exploded, bottom perspective view of the chalk holding device of FIG. 58 and FIG. 76 is a magnified view of one of the encircled portions of FIG. 72. Instead of using a roller 475 (see FIG. 20), which contacts the riding surface when the chalk 60 is sufficiently spent, one or more skid tabs (like first and second skid tabs 7610A, 7610B) may be provided as shown in FIG. 76. In one embodiment, the skid tabs are located near the second ends of each of the arms proximate the chalk receiving member. In one embodiment, the skid tabs are made of hard plastic. In one embodiment, each of the skid tabs has a metal skid plate embedded therein.

FIGS. 77-84 are various views of yet another exemplary embodiment of a chalk holding device 7710 of the present invention. The embodiment of the chalk holding device 7710 is similar to that shown in FIGS. 25-27, but includes a couple of notable differences.

One difference is that it has an integrated chalk receiving member 7810 that operates to receive chalk 60 like chalk receiving member 2910. Reference is made to the description of the chalk receiving member 2910 already provided herein.

It should be noted that the chalk receiving member 7810 has a flat spot 7815, so as to receive specially-designed chalk that has been "keyed" for the chalk holding device 7710. Chalk that has been keyed is included in one embodiment of the present invention.

Another difference is that the chalk holding device 7710 uses first and second screws 7820A, 7820B and first and second nuts 7830A, 7830B, which are received in correspondingly shaped first and second recesses 7840A (not shown), 7840B, instead of first and second pintles 2650A, 2650B and first and second external retaining rings 2675A, 2675B.

FIGS. 79-84 show other details of the chalk holding device 7710.

In some embodiments, the chalk holding device may be designed for a particularly sized bicycle or other wheeled apparatus. In such case, the angle between the chalk receiving member and the arm assembly may be fixed or non-adjustable. In one embodiment, the chalk receiving member may be integral with the arm assembly.

In one embodiment, the axle cups do not pivot relative their corresponding arms. Instead, they are fixed.

In one embodiment, the arms may be comprised of two or more pieces, so as to reduce the overall size of the device for packaging and/or shipping.

It should be understood that any male components (e.g., male connectors) may be substituted for female components (e.g., female connectors).

Several embodiments of the invention have been described. It should be understood that the concepts described in connection with one embodiment of the invention may be combined with the concepts described in connection with another embodiment (or other embodiments) of the invention.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A chalk holding device for attachment to a bicycle, wherein the bicycle has a wheel and an axle with a first end and a second end, the chalk holding device comprising:
   a chalk-receiving member for receiving chalk therein;
   first and second arms extending from the chalk-receiving member towards the axle, the first arm having a first axle cup for receiving a first end of the axle and the second arm having a second axle cup for receiving a second end of the axle, wherein the first axle cup is connected to the first arm by a ball and socket joint, such that the first axle cup pivots relative to the first arm in an infinite number of directions, and wherein the first axle cup has an axis, wherein the second axle cup is connected to the second arm by a ball and socket joint, such that the second axle cup pivots relative to the second arm in an infinite number of directions, and wherein the second axle cup has an axis, wherein the first arm has a first end and the second arm has a second end, wherein the first and second ends are moveable into a plurality of positions each defined by a distance between the first and second ends, and wherein the axis of the first axle cup and the axis of the second axle cup are able to be aligned with one another in the plurality of positions.

2. The chalk holding device of claim 1, wherein the first and second arms are made of a material that is resilient, such that the resiliency of the material provides a bias force to bias the first and second axle cups towards one another.

3. The chalk holding device of claim 1, wherein the first and second axle cups provide a secure, but non-permanent connection to the first and second axle ends.

4. The chalk holding device of claim 1, wherein no tools are required to attach the device to or detach the device from the bicycle.

5. The chalk holding device of claim 1, further including a roller proximate the chalk-receiving member and which contacts a riding surface when chalk has been substantially expended, so as to reduce damage to the device from the riding surface when chalk has been substantially expended.

6. The chalk holding device of claim 5, wherein the roller does not contact the riding surface when a sufficient amount of chalk is available, such as when a new piece of chalk has been properly inserted into the chalk-receiving member.

7. A chalk holding device for attachment to a bicycle, wherein the bicycle has a wheel and an axle with a first end and a second end, the chalk holding device comprising:

a chalk-receiving member for receiving chalk therein;

first and second arms extending from the chalk-receiving member towards the axle, the first arm having a first axle cup for receiving a first end of the axle and the second arm having a second axle cup for receiving a second end of the axle, wherein the first axle cup and the second axle cup each have an open end and a closed end, wherein the first axle cup is connected to the first arm by a ball and socket joint, such that the first axle cup pivots relative to the first arm in an infinite number of directions, and wherein the second axle cup is connected to the second arm by a ball and socket joint, such that the second axle cup pivots relative to the second arm in an infinite number of directions.

8. The chalk holding device of claim 7 further including a first magnet positioned within the first axle cup and a second magnet positioned within the second axle cup.

9. The chalk holding device of claim 7, wherein the first arm has a first end and the second arm has a second end, wherein the first and second ends are moveable into a plurality of positions each defined by a distance between the first and second ends, and wherein the axis of the first axle cup and the axis of the second axle cup are able to be aligned with one another in the plurality of positions.

10. The chalk holding device of claim 7, wherein the first and second arms are made of a material that is resilient, such that the resiliency of the material provides a bias force to bias the first and second axle cups towards one another.

11. The chalk holding device of claim 7, wherein the first and second axle cups provide a secure, but non-permanent connection to the first and second axle ends.

12. The chalk holding device of claim 7, wherein no tools are required to attach the device to or detach the device from the bicycle.

13. The chalk holding device of claim 7, further including a roller proximate the chalk-receiving member and which contacts a riding surface when chalk has been substantially expended, so as to reduce damage to the device from the riding surface when chalk has been substantially expended.

14. The chalk holding device of claim 13, wherein the roller does not contact the riding surface when a sufficient amount of chalk is available, such as when a new piece of chalk has been properly inserted into the chalk-receiving member.

15. A chalk holding device for attachment to a bicycle, wherein the bicycle has a wheel and an axle with a first end and a second end, the chalk holding device comprising:

a chalk-receiving member for receiving chalk therein;

first and second arms extending from the chalk-receiving member towards the axle, the first arm having a first axle cup for receiving a first end of the axle and the second arm having a second axle cup for receiving a second end of the axle, wherein the first axle cup and the second axle cup each have an open end and a closed end; and, a first magnet positioned within the first axle cup and a second magnet positioned within the second axle cup.

16. The chalk holding device of claim 15, further including a roller proximate the chalk-receiving member and which contacts a riding surface when chalk has been substantially expended, so as to reduce damage to the device from the riding surface when chalk has been substantially expended.

17. The chalk holding device of claim 16, wherein the roller does not contact the riding surface when a sufficient amount of chalk is available, such as when a new piece of chalk has been properly inserted into the chalk-receiving member.

18. The chalk holding device of claim 16, wherein the first axle cup is connected to the first arm by a ball and socket joint, such that the first axle cup pivots relative to the first arm in an infinite number of directions, and wherein the second axle cup is connected to the second arm by a ball and socket joint, such that the second axle cup pivots relative to the second arm in an infinite number of directions.

19. A chalk holding device for attachment to a bicycle, wherein the bicycle has a wheel and an axle with a first end and a second end, the chalk holding device comprising:

a chalk-receiving member for receiving chalk therein;

first and second arms extending from the chalk-receiving member towards the axle, the first arm having a first axle cup for receiving a first end of the axle and the second arm having a second axle cup for receiving a second end of the axle, wherein the first axle cup and the second axle cup each have an open end and a closed end; and, a roller proximate the chalk-receiving member and which contacts a riding surface when chalk has been substantially expended, so as to reduce damage to the device from the riding surface when chalk has been substantially expended.

20. The chalk holding device of claim 19, wherein the roller does not contact the riding surface when a sufficient amount of chalk is available, such as when a new piece of chalk has been properly inserted into the chalk-receiving member.

* * * * *